US012647015B2

(12) United States Patent
Dwivedi et al.

(10) Patent No.: US 12,647,015 B2
(45) Date of Patent: Jun. 2, 2026

(54) CURRENT RECONSTRUCTORS AND ASSOCIATED SYSTEMS AND METHODS

(71) Applicant: Analog Devices International Unlimited Company, Limerick (IE)

(72) Inventors: Abhishek Dwivedi, Dublin (IE); Pietro Filoramo, Dublin (IE); Marwan Elfleet, Glasgow (GB)

(73) Assignee: Analog Devices International Unlimited Company, Limerick (IE)

( * ) Notice: Subject to any disclaimer, the term of this patent is extended or adjusted under 35 U.S.C. 154(b) by 281 days.

(21) Appl. No.: 18/438,211

(22) Filed: Feb. 9, 2024

(65) Prior Publication Data

US 2025/0260301 A1    Aug. 14, 2025

(51) Int. Cl.
*H02M 1/00* (2006.01)
*H02M 3/156* (2006.01)
*H02M 3/158* (2006.01)

(52) U.S. Cl.
CPC ....... *H02M 1/0009* (2021.05); *H02M 1/0025* (2021.05); *H02M 3/156* (2013.01); *H02M 3/158* (2013.01)

(58) Field of Classification Search
CPC .. H02M 1/0009; H02M 1/0025; H02M 3/156; H02M 3/158
See application file for complete search history.

(56) References Cited

U.S. PATENT DOCUMENTS

| | | | | |
|---|---|---|---|---|
| 2020/0161975 A1* | 5/2020 | Munroe | ................ | H02M 3/158 |
| 2022/0345043 A1* | 10/2022 | Krugly | ................ | H02M 1/0025 |
| 2023/0387797 A1* | 11/2023 | Chang | .................... | H02M 1/32 |
| 2024/0258915 A1* | 8/2024 | Tennant | ................ | H02M 3/156 |

* cited by examiner

*Primary Examiner* — Lakaisha Jackson
(74) *Attorney, Agent, or Firm* — ArentFox Schiff LLP

(57) ABSTRACT

A method for generating an inductor current signal representing magnitude of current flowing through an inductor of a switching power converter includes (i) applying a first current signal to a first capacitive device during a first switching state of the switching power converter, the first current signal having a first slope, (ii) applying a second current signal to the first capacitive device during a second switching state of the switching power converter, the second current signal having a polarity that is opposite of a polarity of the first current signal, and (iii) adjusting the first slope to reduce a phase error in a voltage of the first capacitive device.

20 Claims, 13 Drawing Sheets

*700*

710

704

421

From 1st Current
Circuitry 404

706

Φ1→

Φ2

$V_{cs}$

708

712

$V_{recon}$ 702    120

Based on 1st
Current Signal $I_{1st}$

Based on Current
Sense Signal $V_{cs}$

*800*

Magnitude $V_{recon}$ (1st)        (2nd)        (1st)        (2nd)        Time $t_{on}$        $t_{off}$        $t_{on}$        $t_{off}$

T        T

1200

1300

1400

1500

CURRENT RECONSTRUCTORS AND ASSOCIATED SYSTEMS AND METHODS

BACKGROUND

Switching power converters are widely used in electronic devices, such as to provide a regulated electric power source. A switching power converter is configured such that its solid-state power switching devices do not continuously operate in their active states; instead, the power switching devices repeatedly switch between their on-states and off-states. Inductors are commonly used for energy storage in switching power converters.

DETAILED DESCRIPTION OF THE EMBODIMENTS

Figure 1:
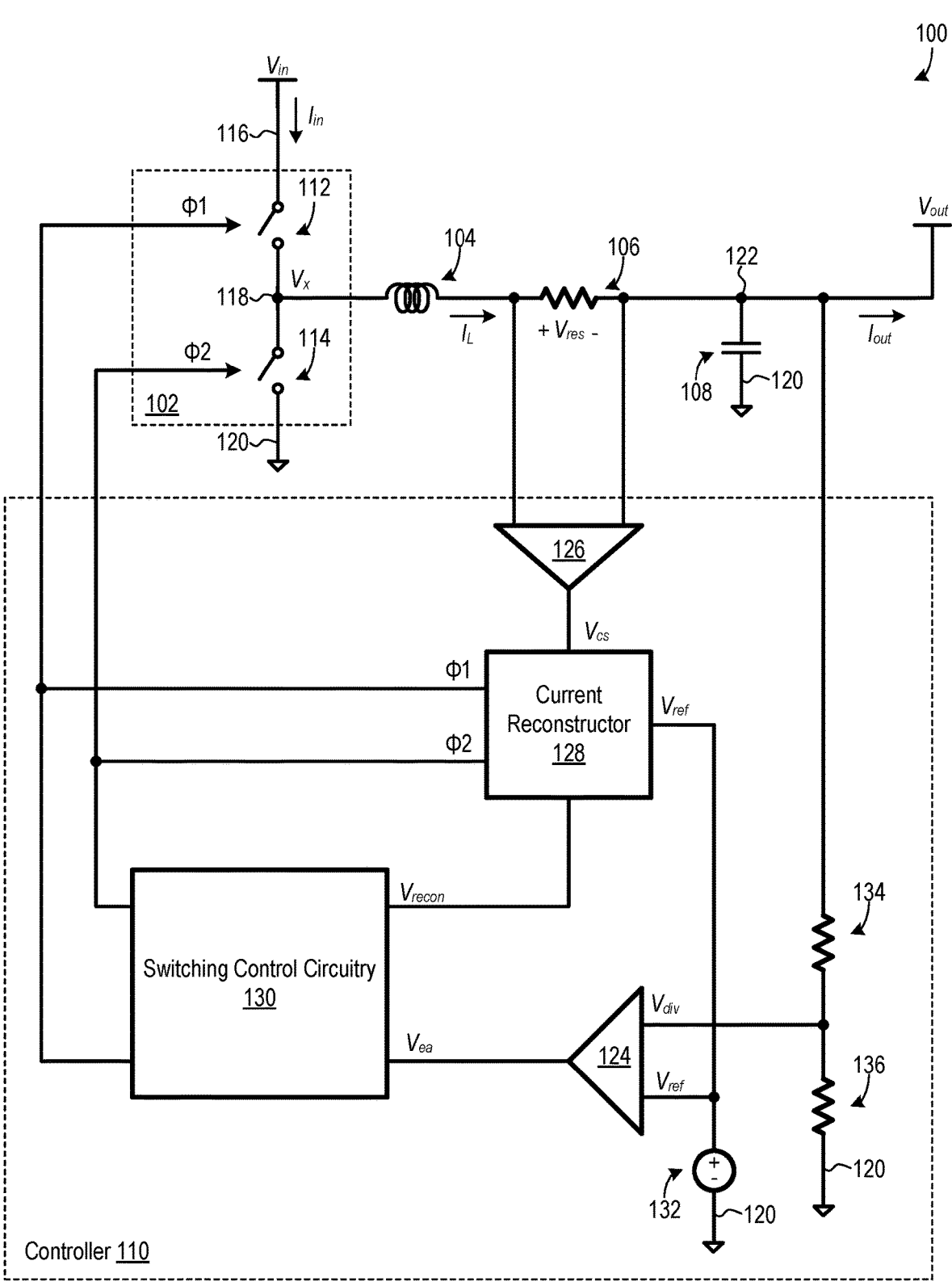
FIG. 1 is a schematic diagram of a switching power converter including a current reconstructor, according to an embodiment.

A switching power converter commonly includes at least one switching stage, at least one inductor, and controller, where the controller causes the switching stage to switch a terminal of the inductor between at least two electrical nodes, to perform power conversion. The switching stage includes at least a control switching device, which is a switching device that the controller modulates to regulate one or more parameters of the switching power converter. For example, a controller in a switching power converter is typically configured to control duty cycle of the switching power converter, which is a ratio of on-time of a control switching device to a switching period of the switching power converter, to regulate one or more parameters of the switching power converter, such as input or output voltage magnitude or input or output current magnitude. It may sometimes be necessary for a switching power converter to operate at a low duty cycle, such as in applications where there is a large difference between input voltage magnitude and output voltage magnitude.

A controller of a switching power converter may implement current mode control, which is a control technique where switching stage operation is at least partially a function of magnitude of current flowing through an inductor of the switching power converter. For example, one current mode control technique is peak current mode control (PCMC), where on-time of a control switching device is terminated in response to a signal representing current flowing through the inductor of the switching power converter reaching a control loop error signal.

Current flowing through an inductor is conventionally sensed by using a current sense amplifier to amplify a voltage across a current sense resistor in series with the inductor, to generate a current sense signal that is proportional to magnitude of current flowing through the inductor. A conventional current sense amplifier, though, is not capable of reliably generating a current sense signal when a control switching device is in its on-state for a short time duration, e.g., 40 nanoseconds or less, during a switching period. For example, a conventional current sense amplifier typically includes noise blanking circuitry to block transmission of switching noise to its output current sense signal, and this noise blanking circuitry may cause the current sense signal to omit a significant portion of sensed current information when the control switching device on-time is small. As another example, bandwidth limitations of a conventional current sense amplifier limit the current sense amplifier's ability to sense current when control switching device on-time is small. As such, a conventional controller implementing current mode control may be unstable during operation with short control switching device on-time, such as when operating at a small duty cycle. It should be noted that control switching device on-time may be particularly short at high switching frequencies due to switching periods being short at high switching frequencies.

Disclosed herein are current reconstructors and associated systems and methods which may at least partially overcome one or more of the aforementioned problems. The new current reconstructors are used, for example, in a controller of a switching power converter to reliably generate a signal proportional to magnitude of current flowing through an inductor, or other switching power converter element, even when control switching device on-time is short. Particular embodiments of the new current reconstructors are configured to (i) sense slope of current flowing through an inductor of a switching power converter when a control switching device connected to the inductor is in its off-state and (ii) use a negative feedback closed loop control technique to predict slope of inductor current during on-time of the control switching device, thereby generating a signal that is proportional to current flowing through the inductor. Accordingly, the new current reconstructors and associated system and methods may enable current mode control, such as peak current mode control, in switching power converter applications that would not be feasible using conventional current sense techniques.

FIG. 1 is a schematic diagram of a switching power converter 100, which includes an embodiment of the new current reconstructors discussed herein. Switching power converter 100 includes a switching stage 102, an inductor 104, a current sense resistor 106, an output capacitor 108, and a controller 110. Switching stage 102 include a control switching device 112 and a freewheeling switching device 114. Each of control switching device 112 and freewheeling switching device 114 includes, for example, one or more transistors, such as field effect transistors (FETs), bipolar junction transistors (BJTs), and insulated gate bipolar junction transistors (IGBTs). Control switching device 112 is electrically coupled between an input power node 116 and a switching node 118, and freewheeling switching device 114 is electrically coupled between switching node 118 and a reference node 120. Switching stage 102 is configured to switch a terminal of inductor 104 connected to switching node 118 between input power node 116 and reference node 120 under the command of controller 110. Reference node 120 is depicted as being a ground node, such as an earth ground node or a chassis ground node. It is understood, though, that reference node 120 needs not be a ground node, and reference node 120 accordingly could be at a different electrical potential than an earth ground or a chassis ground.

Inductor 104 and current sense resistor 106 are electrically coupled in series between switching node 118 and an output power node 122. While FIG. 1 illustrates the relative topological locations of inductor 104 and current sense resistor 106 being such that current flowing from switching node 118 to output power node 122 flows through inductor 104 before flowing through current sense resistor 106, the relative topological locations of inductor 104 and current sense resistor 106 could be swapped. In some embodiments, current sense resistor 106 is a discrete element, and in some other embodiments, current sense resistor 106 is parasitic resistance of an electrical conductor, such as parasitic resistance of a printed circuit board (PCB) trace. Additionally, in some alternate embodiments, current sense resistor 106 is replaced with parasitic resistance of inductor 104, and switching power converter 100 includes additional components to separate a resistive component of a voltage across inductor 104 from an inductive component of a voltage across inductor 104.

Output capacitor 108 is electrically coupled between output power node 122 and reference node 120, and a load (not shown) is optionally electrically coupled to output power node 122. Output capacitor 108, for example, absorbs ripple current generated by switching of switching power converter 100 and/or helps supports transient loads powered by switching power converter 100. Output capacitor 108 could be omitted or replaced with multiple capacitors without departing from the scope hereof. Switching power converter 100 has an input voltage $V_{in}$ on input power node 116 and an output voltage $V_{out}$ on output power node 122. An input current $I_{in}$ flows into switching power converter 100 from input power node 116, and an output current $I_{out}$ flows out of switching power converter 100 at output power node 122 to a load electrically coupled to output power node 122. A polarity of input current $I_{in}$ and output current $I_{out}$ could be either positive or negative, depending on the operating conditions of switching power converter 100.

Controller 110 includes an error amplifier 124, a current sense amplifier 126, a current reconstructor 128, switching control circuitry 130, a voltage reference 132, a first resistor 134, and a second resistor 136. Error amplifier 124 is configured to generate an error amplifier signal $V_{ea}$ representing a difference between an actual output voltage $V_{out}$ of switching power converter 100 and a desired output voltage of switching power converter 100, to enable switching power converter 100 to regulate magnitude of output voltage Vow. Specifically, first resistor 134 and second resistor 136 collectively divide a magnitude of output voltage $V_{out}$ down to a divider voltage $V_{div}$, and error amplifier 124 amplifies a difference between divider voltage $V_{div}$ and a reference voltage $V_{ref}$ of voltage reference 132 to generate error amplifier signal $V_{ea}$. Respective resistances of resistors $R_{134}$ and $R_{136}$ are chosen to comply with EQN. 1 below, where $V_{des}$ is desired magnitude of voltage of $V_{out}$, $R_{134}$ is resistance of first resistor 134, and $R_{136}$ is resistance of second resistor 136. It should be noted that first resistor 134 and second resistor 136 may be omitted in embodiments where $V_{des}$ is equal to $V_{ref}$.

$$\frac{V_{des}}{V_{ref}} = \frac{(R_{134} + R_{136})}{R_{136}} \qquad \text{(EQN. 1)}$$

Current $I_L$ flowing through inductor 104 generates a voltage $V_{res}$ when flowing through current sense resistor 106 such that magnitude of voltage $V_{res}$ is proportional to magnitude of current $I_L$. Current sense amplifier 126 amplifies voltage $V_{res}$ to generate current sense signal $V_{cs}$, which is generally proportional to magnitude of current $I_L$. However, bandwidth limitations of current sense amplifier 126, as well as noise blanking circuitry within current sense amplifier 126, impair ability of current sense amplifier 126 to generate current sense signal $V_{cs}$ when control switching device 112 operates in its on-state for a short duration, e.g., 40 nanoseconds of less, during each switching period of switching power converter 100. Consequently, current sense signal $V_{cs}$ may not accurately represent magnitude of current $I_L$ during on-time of control switching device 112 when such on-time is of short duration.

However, current reconstructor 128 at least partially overcomes the above discussed drawbacks of current sense amplifier 126 by generating a reconstructed current signal $V_{recon}$ that is proportional to magnitude of current $I_L$ even during operation of switching power converter 100 with short on-time of control switching device 112. As discussed further below, particular embodiments of current reconstructor 128 generate reconstructed current signal $V_{recon}$ at least partially by sensing slope of current $I_L$ when control switching device 112 is in its off-state (and freewheeling switching device 114 is in its on-state) and (ii) predicting slope of current $I_L$ while control switching device 112 is in its on-state.

Switching control circuitry 130 is configured to use a current mode control technique to generate control signals φ1 and φ2 to control switching device 112 and freewheeling switching device 114, respectively, at least partially based on error amplifier signal $V_{ea}$ and reconstructed current signal $V_{recon}$. Specifically, switching control circuitry 130 generates control signal $\phi1$ to modulate control switching device 112 by causing control switching device 112 to switch between its on-state and off-state at a duty cycle which minimizes magnitude of error amplifier signal $V_{ea}$, such as using a pulse width modulation (PWM) technique or a pulse frequency modulation (PFM) technique, thereby regulating magnitude of output voltage $V_{out}$. Additionally, switching control circuitry 130 generates control signal $\phi2$ to control switching of freewheeling switching device 114 such that freewheeling switching device 114 provides a path for current $I_L$ when control switching device 112 is in its off-state. In this document, a switching device is in its on-state when it is operating in its conductive state, and the switching device is in its off-state when it is operating in its non-conductive state, neglecting effects of a body diode (if present), or any other parasitic element, of the switching device. Switching power converter 100 could be modified to regulate a parameter of switching power converter 100 other than output voltage $V_{out}$ magnitude, such as magnitude of input voltage $V_{in}$, magnitude of input current $I_{in}$, or magnitude of output current $I_{out}$, with appropriate changes to error amplifier 124 and/or associated circuitry.

Figure 2:
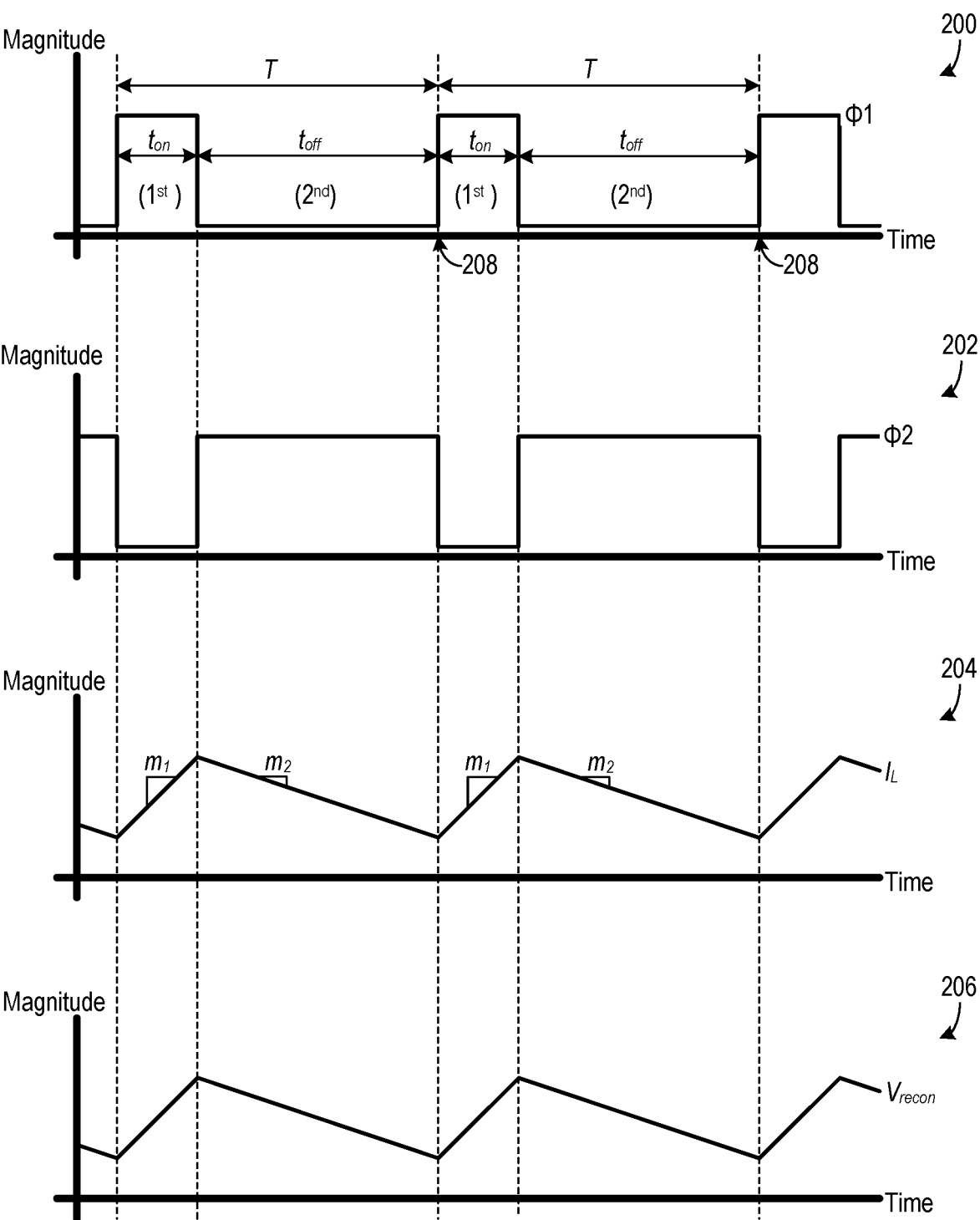
FIG. 2 includes four graphs illustrating one example of operation of the FIG. 1 switching power converter.

FIG. 2 includes four graphs 200, 202, 204, and 206 having a common time base and illustrating one example of operation of switching power converter 100. Graphs 200, 202, 204, and 206 assume that switching power converter 100 is operating under steady state conditions such that the waveforms of graphs 200, 202, 204, and 206 are periodic. Graph 200 is magnitude of control signal $\phi1$ versus time, graph 202 is magnitude of control signal $\phi2$ versus time, graph 204 is magnitude of current $I_L$ versus time, and graph 206 is magnitude of reconstructed current signal $V_{recon}$ versus time. The FIG. 2 graphs assume that (i) each of control signals $\phi1$ and $\phi2$ is asserted when in a logic high state, (ii) control switching device 112 operates in its on-state when control signal $\phi1$ is asserted, (iii) control switching devices 112 operates in off-state when control signal $\phi1$ is de-asserted, (iv) freewheeling switching device 114 operates in its on-state when control signal $\phi2$ is asserted, and (v) freewheeling switching device 114 operates in its off-state when control signal $\phi2$ is de-asserted. However, control signals 11 and $\phi2$ could have other polarities, and control switching device 112 and freewheeling switching device 114 could be configured to react to respective control signals 11 and $\phi2$ in a different manner, without departing from the scope hereof. Additionally, while the FIG. 2 graphs assume that switching power converter 100 is operating in a continuous current conduction mode, switching power converter 100 could alternately operate in a discontinuous current conduction mode with appropriate modifications, e.g., with addition of circuitry configured to (i) detect zero crossing of current $I_L$ and (ii) provide a signal to current reconstructor 128 indicating that current $I_L$ has crossed zero. Furthermore, while FIG. 2 illustrates control signal $\phi2$ being complementary to control signal $\phi1$, some embodiments of switching control circuitry 130 are configured to introduce deadtime between assertion of control signal $\phi1$ and assertion of control signal $\phi2$, and vice versa, to prevent "shoot-through," i.e., simultaneous conduction of control switching device 112 and freewheeling switching device 114. Finally, in some alternate embodiments, freewheeling switching device 114 is replaced with a diode, and in these alternate embodiments, switching control circuitry 130 need not be capable of generating control signal $\phi2$.

Control switching device 112 has an on-time of $t_{on}$ and an off-time of $t_{off}$, in each switching period T of switching power converter 100, as illustrated in FIG. 2. Accordingly, duty cycle D of switching power converter 100 is equal to $t_{on}/T$. In this document, switching power converter 100 is considered to operate in a first switching state, designated by "(1$^{st}$)" in the present figures, during $t_{on}$ of each switching period T, and switching power converter 100 is considered to operate in a second switching state, designated by "(2$^{nd}$)" in the present figures, during $t_{off}$ of each switching period T. FIG. 2 illustrates a time 208 during each switching period T when switching power converter 100 transitions from the second switching state to the first switching state. Current $I_L$ has a slope of $m_1$ during the first switching state of switching power converter 100, current $I_L$ has a slope of $m_2$ during the second switching state of switching power converter 100. Duration of $t_{on}$ will vary according to operating conditions, such as ratio of $V_{out}/V_{in}$, of switching power converter 100. Additionally, switching period T duration, and its reciprocal switching frequency of switching power converter 100, are a design choice. For example, a short switching period T duration may be selected to promote low ripple current magnitude, while a large switching period T duration may be selected to promote low switching losses. It should be noted that magnitude of reconstructed current signal $V_{recon}$ is proportional to magnitude of current $I_L$, as collectively illustrated in graphs 204 and 206. Additionally, as discussed above, current reconstructor 128 is advantageously capable of generating reconstructed current signal $V_{recon}$ such that it is proportional to magnitude of current $I_L$ even when duration of time $t_{on}$ is short.

Figure 3:
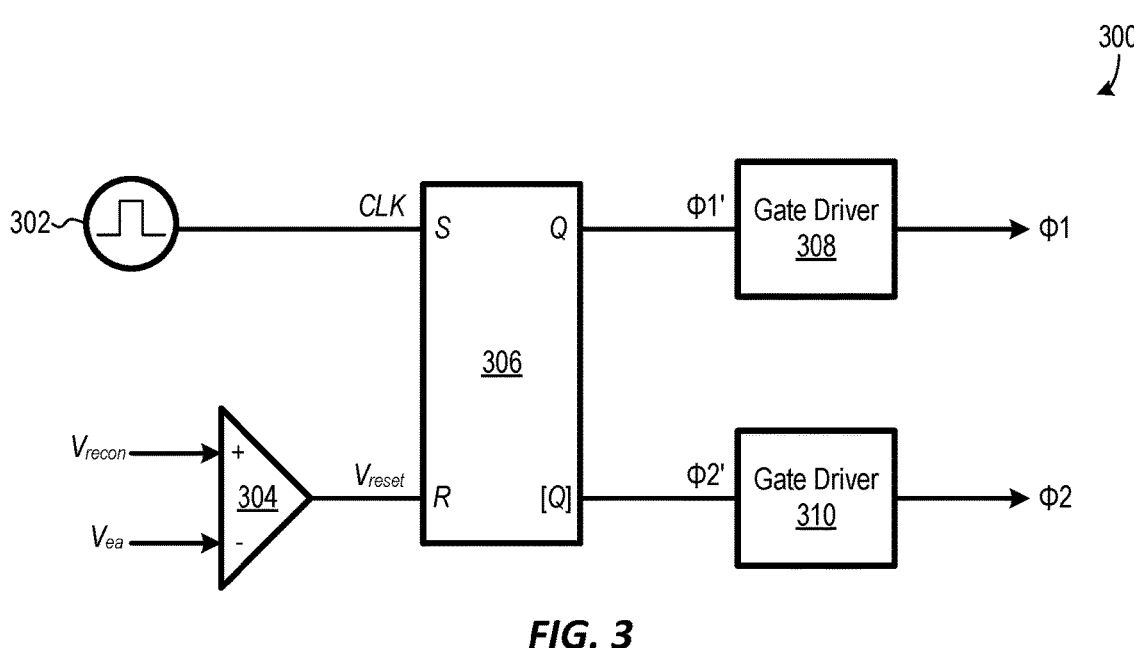
FIG. 3 is a schematic diagram of one embodiment of switching control circuitry of the FIG. 1 switching power converter, where the switching control circuitry uses a peak current mode control technique.

Referring again to FIG. 1, particular embodiments of switching control circuitry 130 are configured to use a peak current mode control technique to generate control signals $\phi1$ and $\phi2$. For example, FIG. 3 is a schematic diagram of switching control circuitry 300, which is one possible embodiment of switching control circuitry 130 that is configured to use a peak current mode control technique. Switching control circuitry 300 includes a clock 302, a comparator 304, a S-R flip-flop 306, a first gate driver 308, and a second gate driver 310. Clock 302 is configured to generate a clock signal CLK at a switching frequency of switching power converter 100, and clock signal CLK sets S-R flip-flop 306. Comparator 304 compares error amplifier signal $V_{ea}$ to reconstructed current signal $V_{recon}$, and comparator 304 asserts an output signal $V_{reset}$ in response to reconstructed current signal $V_{recon}$ reaching error amplifier signal $V_{ea}$, which occurs at each time switching power converter 100 transitions from its first switching state to its second switching state. S-R flip-flop 306 is reset in response to comparator output signal $V_{reset}$ being asserted. Non-inverting output Q of S-R flip-flop 306 is asserted when S-R flip-flop 306 is set, and non-inverting output Q of S-R flip-flop 306 is de-asserted when S-R flip-flop 306 is reset. Conversely, inverting output [Q] of S-R flip-flop 306 is de-asserted when S-R flip-flop 306 is set, and inverting output [Q] of S-R flip-flop 306 is asserted when S-R flip-flop 306 is reset. A signal $\phi1'$ from non-inverting output Q of S-R flip-flop 306 is conditioned by first gate driver 308 to obtain control signal $\phi1$, and a signal $\phi2'$ from inverting output [Q] of S-R flip-flop 306 is conditioned by second gate driver 310 to obtain control signal $\phi2$. Each of first gate driver 308 and second gate driver 310 performs conditioning of its respective signal, for example, by performing level shifting and/or amplification of the signal.

Switching control circuitry 300 assumes that each of control switching device 112 and freewheeling switching device 114 includes one or more respective transistors with gates, such as FETs or IGBTs. However, first gate driver 308 and second gate driver 310 could be replaced by respective base driver circuitry in embodiments where each of control switching device 112 and freewheeling switching device 114 includes one or more BJTs instead of transistors with gates. Additionally, first gate driver 308 and second gate driver 310 could be omitted in embodiments where S-R flip-flop 306 is capable of directly generating control signal φ1 and control signal φ2 that are suitable for driving control switching device 112 and freewheeling switching device 114, respectively.

Figure 4:
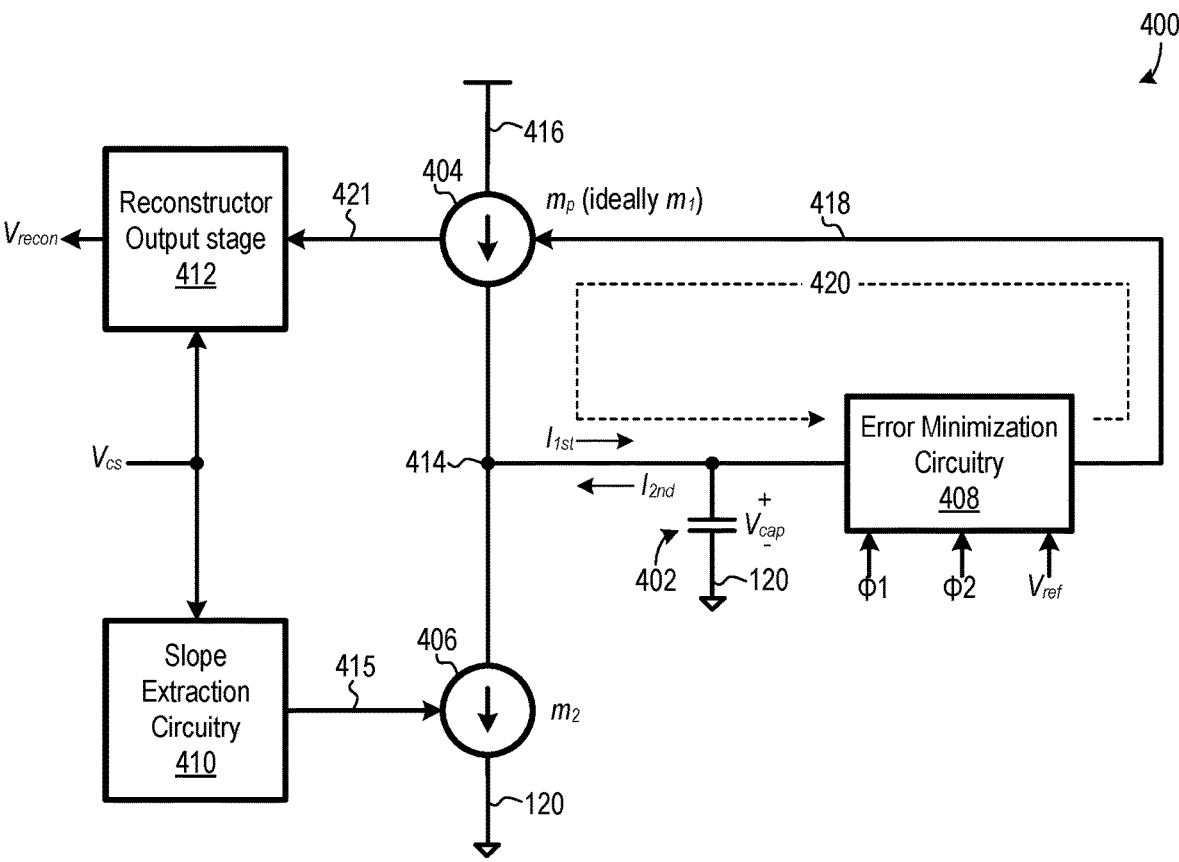
FIG. 4 is a schematic diagram of one embodiment of the current reconstructor of the FIG. 1 switching power converter.

As illustrated in FIG. 1, particular embodiments of current reconstructor 128 are configured to generate reconstructed current signal $V_{recon}$ at least partially based on current sense signal $V_{cs}$, reference voltage $V_{ref}$, and one or both of control signal φ1 and control signal φ2. For example, FIG. 4 is a block diagram of a current reconstructor 400, which is one possible embodiment of current reconstructor 128. Current reconstructor 400 includes a capacitive device 402, first current circuitry 404, a second current circuitry 406, error minimization circuitry 408, slope extraction circuitry 410, and a reconstructor output stage 412. Capacitive device 402 is electrically coupled between a ramp node 414 and reference node 120. First current circuitry 404 is electrically coupled between a power node 416 and ramp node 414, and second current circuitry 406 is electrically between ramp node 414 and reference node 120.

First current circuitry 404 is configured to apply a first current signal $I_{1st}$ to capacitive device 402 during the first switching state of switching power converter 100, i.e., during $t_{on}$ of each switching period T. First current signal $I_{1st}$ flows into capacitive device 402, such that first current signal $I_{1st}$ charges capacitive device 402. First current circuitry 404 is controlled by a control signal 418 generated by error minimization circuitry 408, and first current signal $I_{1st}$ has a slope $m_p$. Slope $m_p$ is a predicted slope of current $I_L$ during the first switching state of switching power converter 100, and predicted slope $m_p$ is ideally equal to actual slope $m_1$ of current $I_L$ during the first switching state of switching power converter 100. Duration of the first switching state of switching power converter 100 is related to slope of current $I_L$ during the first switching state. For example, duration of the first switching state duration decreases with increasing slope, and vice versa. Therefore, predicted duration of the first switching state of switching power converter 100 can be derived from predicted slope $m_p$, and vice versa. First current circuitry 404 is further configured to generate a current mirror signal 421 for use by reconstructor output stage 412, where current mirror signal 421 mirrors first current signal $I_{1st}$.

Second current circuitry 406 is configured to apply a second current signal $I_{2nd}$ to capacitive device 402 during the second switching state of switching power converter 100, where second current signal $I_{2nd}$ has a polarity that is opposite of a polarity of the first current signal $I_{1st}$. Accordingly, second current signal $I_{2nd}$ flows out of capacitive device 402 such that second current signal $I_{2nd}$ discharges capacitive device 402. As such, a voltage $V_{cap}$ of capacitive device 402 has a triangular shape, i.e., voltage $V_{cap}$ ramps upward during the first switching state of switching power converter 100, and voltage $V_{cap}$ ramps downward during the second switching state of switching power converter 100. Slope extraction circuitry 410 receives current sense signal $V_{cs}$ as an input, and slope extraction circuitry 410 extracts slope $m_2$ of current $I_L$ during the second switching state of switching power converter 100, i.e., during $t_{off}$ of each switching period T, to generate a current mirror signal 415. Second current circuitry 406 mirrors current $I_L$ during the second switching state of switching power converter 100 in response to current mirror signal 415, such that second current signal $I_{2nd}$ has a slope of $m_2$.

Error minimization circuitry 408 is configured to adjust predicted slope $m_p$ of first current signal $I_{1st}$ via control signal 418 to minimize a difference between predicted slope $m_p$ of current $I_L$ and actual slope $m_1$ of current $I_L$ during the first switching state of switching power converter 100. In particular, error minimization circuitry 408 implements a negative feedback closed control loop, symbolically shown by dashed lines 420 in FIG. 4, to minimize a phase error in voltage $V_{cap}$ and thereby minimize a difference between predicted slope $m_p$ of current $I_L$ and actual slope $m_1$ of current $I_L$ during the first switching state of switching power converter 100. Phase error in voltage $V_{cap}$ represents a difference between (a) a time when voltage $V_{cap}$ reaches a minimum value and (b) a time when switching power converter 100 transitions from its second switching state to its first switching state, e.g., time 208 (FIG. 2), in each switching period T. Minimizing difference between predicted slope $m_p$ of current $I_L$ and actual slope $m_1$ of current $I_L$ during the first switching state of switching power converter 100 also inherently reduces a difference between predicted and actual duration of the first switching state of switching power converter 100.

Figure 5:
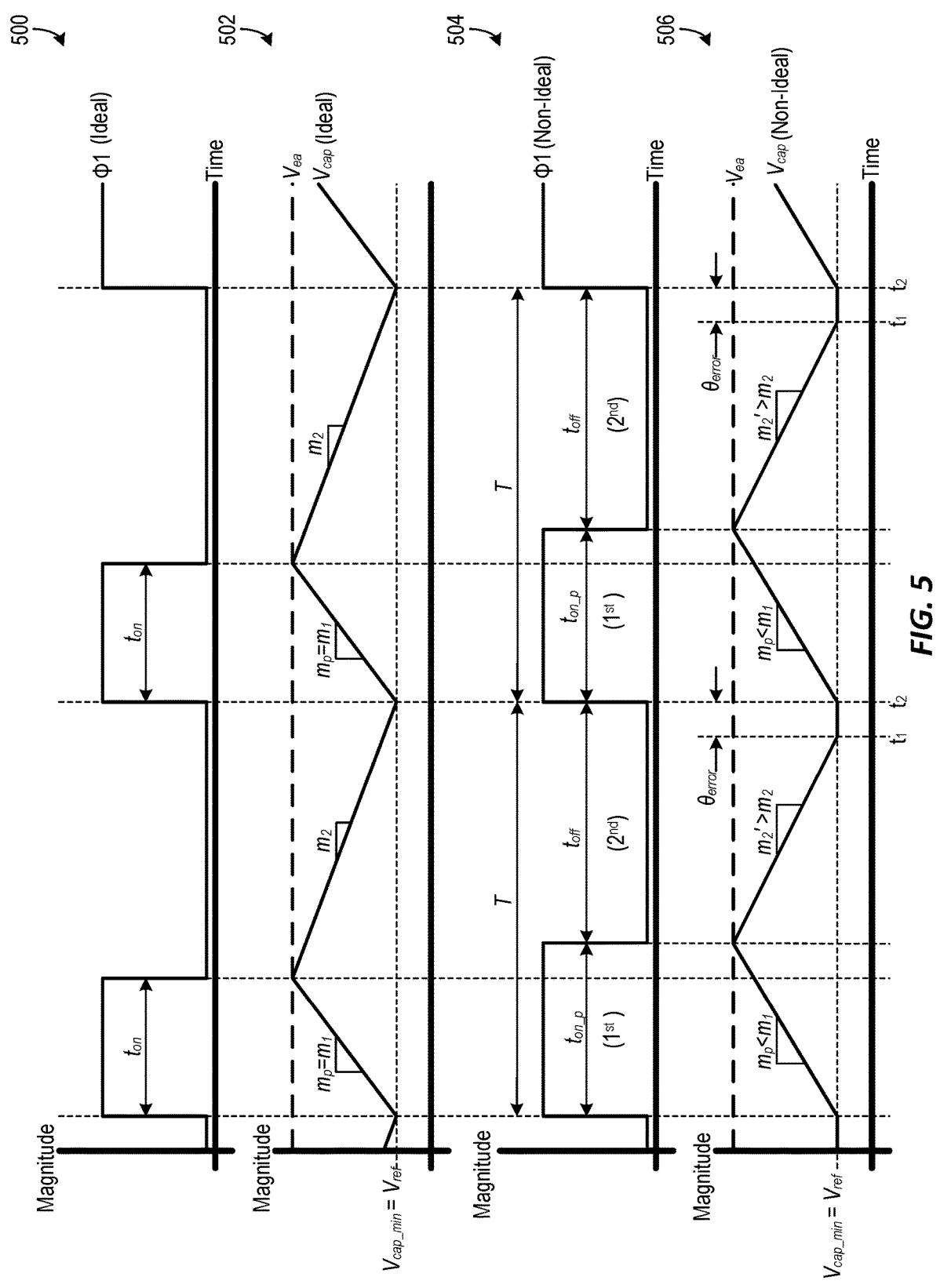
FIG. 5 includes four graphs illustrating an example of operation of the FIG. 4 current reconstructor comparing (i) operation when predicted slope is equal to actual slope to (ii) operation when predicted slope is less than actual slope.

For example, consider FIG. 5, which includes four graphs 500, 502, 504, and 506 comparing one example of operation of current reconstructor 400 (i) where predicted slope $m_p$ is equal to actual slope $m_1$ and (ii) where predicted slope $m_p$ is less than actual slope $m_1$. Graphs 500, 502, 504, and 506 assume that (i) switching control circuitry 130 (FIG. 1) implements peak current mode control and (ii) switching power converter 100 is operating under steady state conditions such that the waveforms of graphs 500, 502, 504, and 506 are periodic. Graphs 500 and 502 illustrate operation of current reconstructor 400 under ideal conditions, i.e., where predicted slope $m_p$ is equal to actual slope $m_1$. Specifically, graph 500 is of magnitude of control signal φ1 versus time under ideal conditions, and graph 502 is of each of voltage $V_{cap}$ of capacitive device 402 and error amplifier voltage $V_{ea}$ versus time under ideal conditions. As evident from graph 502, voltage $V_{cap}$ of capacitive device 402 is a sawtooth waveform having a minimum value $V_{cap\_min}$ equal to $V_{ref}$ and a maximum value equal to error amplifier signal $V_{ea}$.

Graphs 504 and 506, in contrast, illustrate an example of operation of current reconstructor 400 under the same conditions as that of graphs 500 and 502 but under non-ideal conditions where predicted slope $m_p$ is smaller than actual slope $m_1$. Such small value of slope $m_p$ cause a predicted duration $(t_{on\_p})$ of the first switching state in each switching period T to be greater than ideal duration $(t_{on})$ of the first switching state in each switching period T, as evident when comparing graphs 500 and 504. Such long predicted duration of the first switching state $t_{on\_p}$ causes slope $m_2'$ of voltage $V_{cap}$ to be greater than slope $m_2$ under ideal conditions, which causes voltage $V_{cap}$ to reach its minimum value $V_{cap\_min}$ early in each switching period T. Specifically, voltage $V_{cap}$ reaches its minimum value $V_{cap\_min}$ at a time $t_1$ before a time $t_2$ when switching power converter 100 transitions from its second switching state to its first switching state. A difference between time $t_1$ and time $t_2$ in each switching period is T is a phase error $\theta_{error}$ in voltage $V_{cap}$ of capacitive device 402, which is proportional to error in each of (i) predicted slope $m_p$ and (ii) predicted duration $t_{on}$ of the first switching state of switching power converter 100.

In the event current reconstructor 400 is operating as depicted in graphs 504 and 506, error minimization circuitry 408 adjusts operation of first current circuitry 404 via control signal 418 to increase slope of first current signal $I_{1st}$ to minimize phase error $\theta_{error}$ and thereby cause current reconstructor 400 to move toward the ideal operating state depicted in graphs 500 and 502.

Figure 6:
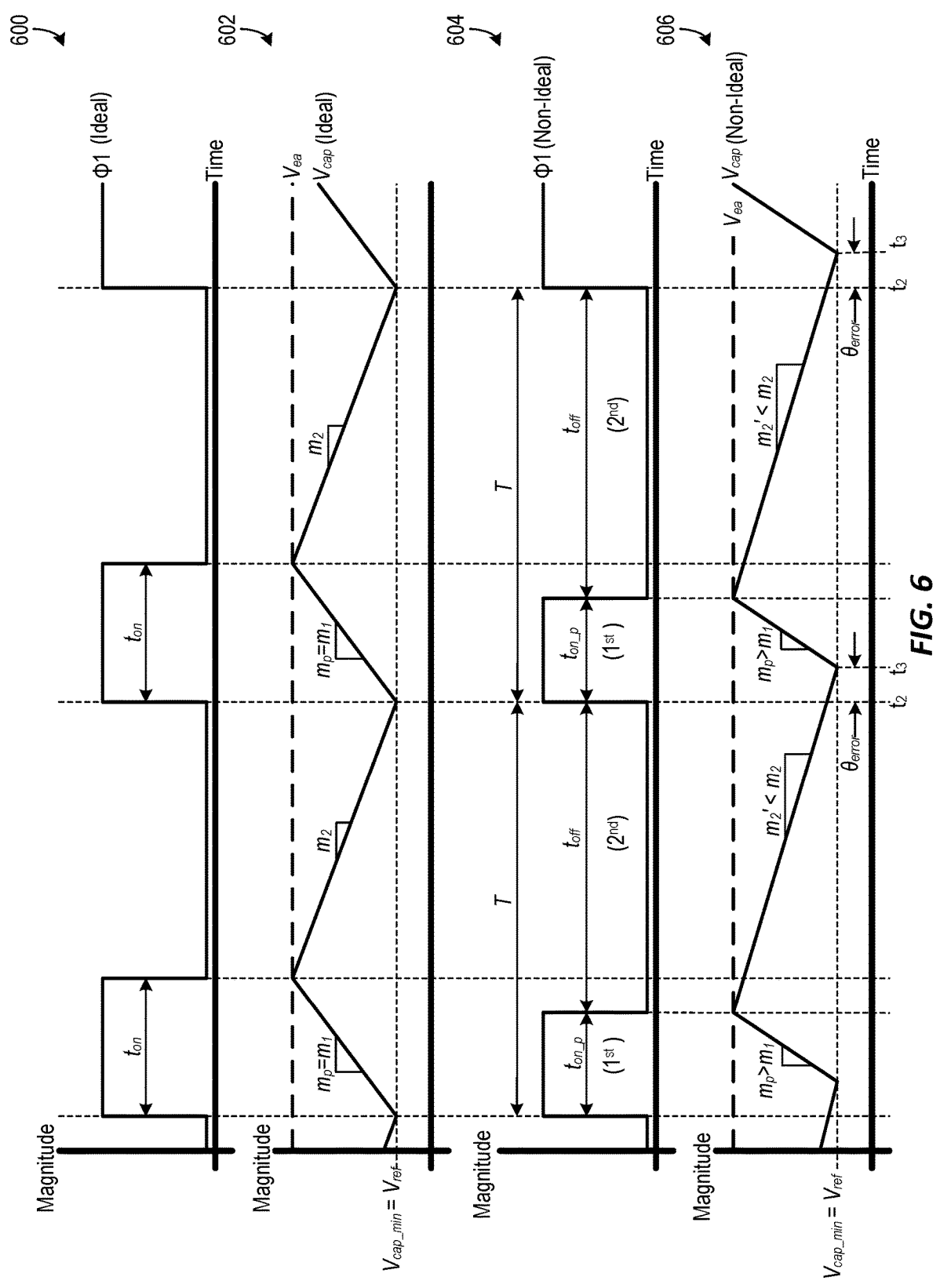
FIG. 6 includes four graphs illustrating an example of operation of the FIG. 4 current reconstructor comparing (i) operation when predicted slope is equal to actual slope to (ii) operation when predicted slope is greater than actual slope.

FIG. 6, on the other hand, includes four graphs 600, 602, 604, and 606 comparing one example of operation of current reconstructor 400 (i) where predicted slope $m_p$ is equal to actual slope $m_1$ and (ii) where predicted slope $m_p$ is greater than actual slope $m_1$. Graphs 600, 602, 604, and 606 assume that (i) switching control circuitry 130 (FIG. 1) implements peak current mode control and (ii) switching power converter 100 is operating under steady state conditions such that the waveforms of graphs 600, 602, 604, and 606 are periodic. Graphs 600 and 602 illustrate operation of current reconstructor 400 under ideal conditions, i.e., where predicted slope $m_p$ is equal to actual slope $m_1$. Specifically, graph 600 is of magnitude of control signal $\phi1$ versus time under ideal conditions, and graph 602 is of each of voltage $V_{cap}$ of capacitive device 402 and error amplifier voltage $V_{ea}$ versus time under ideal conditions. As evident from graph 602, voltage $V_{cap}$ of capacitive device 402 is a sawtooth waveform having a minimum value $V_{cap\_min}$ equal to $V_{ref}$ and a maximum value equal to error amplifier signal $V_{ea}$.

Graphs 604 and 606, in contrast, illustrate an example of operation of current reconstructor 400 under the same conditions as that of graphs 600 and 602 but under non-ideal conditions where predicted slope $m_p$ is greater than actual slope $m_1$. Such large value of slope $m_p$ cause a predicted duration ($t_{on\_p}$) of the first switching state in each switching period T to be shorter than ideal duration ($t_{on}$) of the first switching state in each switching period T, as evident when comparing graphs 600 and 604. Such short predicted duration of the first switching state $t_{on\_p}$ causes slope $m_2'$ of voltage $V_{cap}$ to be less than slope $m_2$ under ideal conditions, which causes voltage $V_{cap}$ to reach its minimum value $V_{cap\_min}$ late i.e., after the end of its respective switching period T. Specifically, voltage $V_{cap}$ reaches its minimum value $V_{cap\_min}$ at a time $t_3$ after a time $t_2$ when switching power converter 100 transitions from its second switching state to its first switching state. A difference between time $t_3$ and time $t_2$ in each switching period T is a phase error $\theta_{error}$ in voltage $V_{cap}$, which is proportional to error in each of (i) predicted slope $m_p$ and (ii) predicted duration $t_{on\_p}$ of the first switching state of switching power converter 100. In the event current reconstructor 400 is operating as depicted in graphs 604 and 606, error minimization circuitry 408 adjusts operation of first current circuitry 404 via control signal 418 to decrease slope of first current signal $I_{1st}$ to minimize phase error $f_{error}$ and thereby cause current reconstructor 400 to move toward to the ideal operating state depicted in graphs 600 and 602.

Referring again to FIG. 4, reconstructor output stage 412 is configured to generate reconstructed current signal $V_{recon}$ based on both current sense signal $V_{cs}$ and current mirror signal 421 mirroring first current signal $I_{st}$. Specifically, reconstructor output stage 412 generates reconstructed current signal $V_{recon}$ such that (i) reconstructed current signal $V_{recon}$ is proportional to first current signal $I_{1st}$ during the first switching state of switching power converter and (ii) reconstructed current signal $V_{recon}$ is proportional to current sense signal $V_{cs}$ during the second switching state of switching power converter. Accordingly, current reconstructor 400 is capable of generating reconstructed current signal $V_{recon}$ such that is accurately reflects current $I_L$ even when duration of the first switching state is short.

Figure 7:
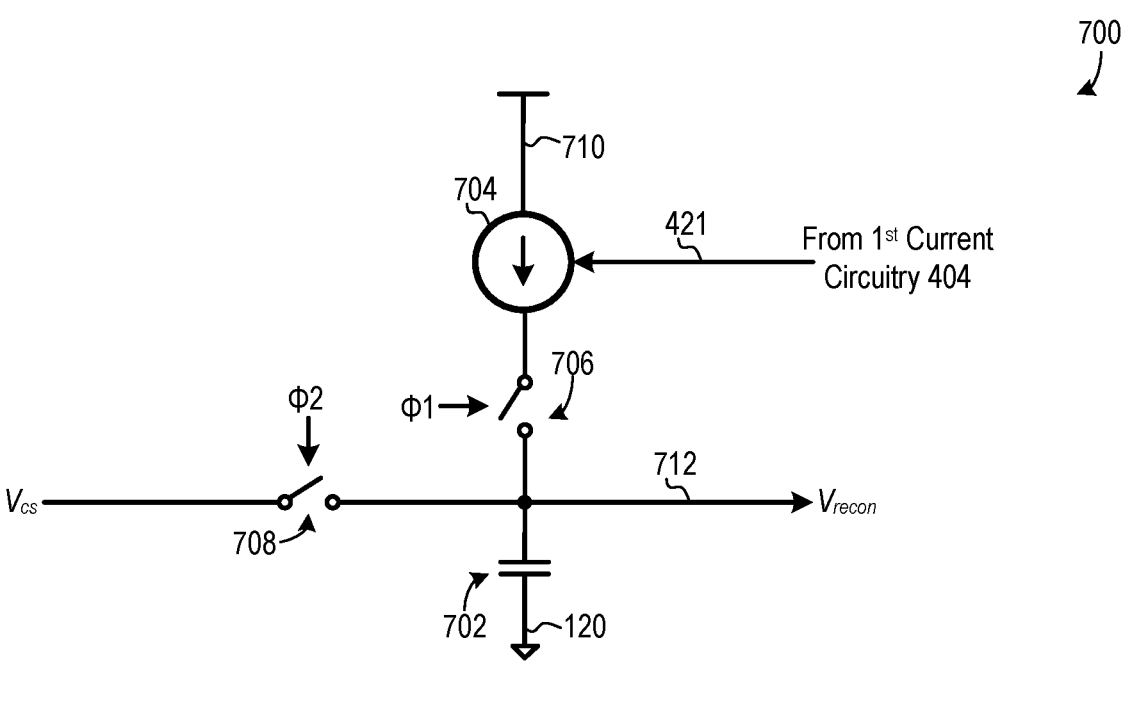
FIG. 7 is schematic diagram of one possible embodiment of a reconstructor output stage of the FIG. 4 current reconstructor.

FIG. 7 is a schematic diagram of a reconstructor output stage 700 which is one possible embodiment of reconstructor output stage 412, although it is understood that reconstructor output stage 412 could be embodied in other manners without departing from the scope hereof. Reconstructor output stage 700 includes a capacitor 702, a current source 704, a switching device 706, and a switching device 708. Current source 704 and switching device 706 are electrically coupled in series between a power node 710 and a reconstructor output node 712, and capacitor 702 is electrically coupled between reconstructor output node 712 and reference node 120. Switching device 708 is electrically coupled between a source of current sense signal $V_{cs}$, i.e., an output of current sense amplifier 126 (not shown in FIG. 7), and reconstructor output node 712. Switching device 706 is controlled by control signal $\phi1$, such that switching device 706 is closed in the first switching state of switching power converter 100 and switching device 706 is open in the second switching state of switching power converter 100. Additionally, current source 704 is configured to mirror first current signal $I_{1st}$ of current reconstructor 400 (FIG. 4) in response to current mirror signal 421, and current flowing through current source 704 therefore has a slope of $m_p$. Additionally, capacitor 702 has the same capacitance as capacitive device 402 (FIG. 4). Therefore, voltage on reconstructor output node 712, which is equal to reconstructed current signal $V_{recon}$, is proportional to voltage $V_{cap}$ of capacitive device 402 (FIG. 4) during the first switching state of switching power converter. Switching device 708 is closed when control signal $\phi2$ is asserted, and switching device 708 is open when control signal $\phi2$ is de-asserted. Therefore, reconstructed current signal $V_{recon}$ tracks current sense signal $V_{cs}$ during the second switching state of switching power converter 100.

Figure 8:
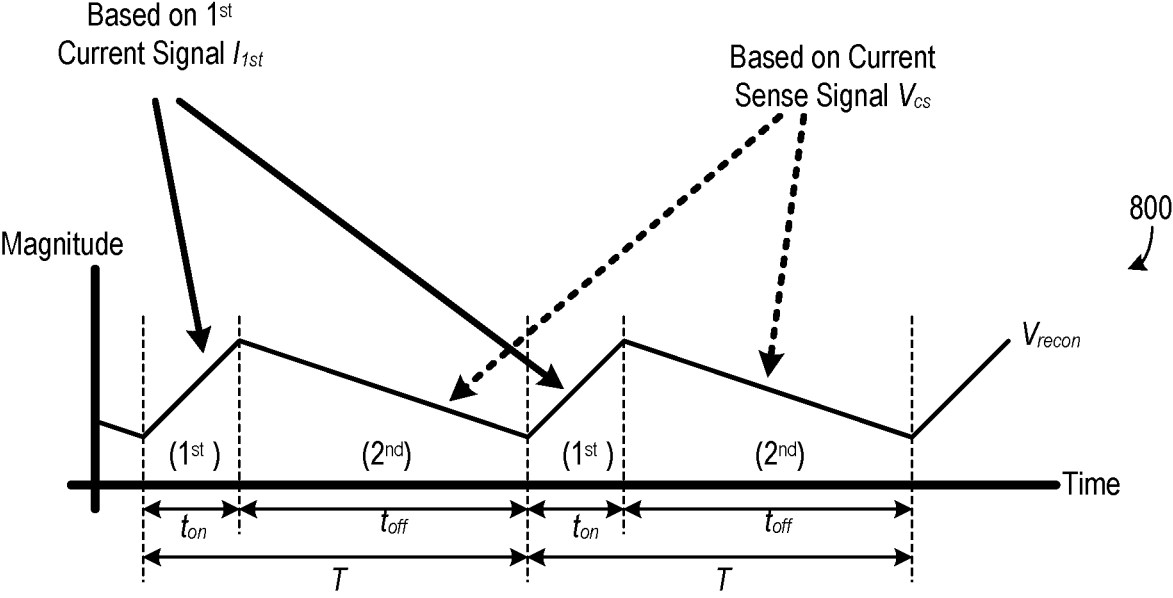
FIG. 8 is a graph illustrating one example of a reconstructed current signal generated by the FIG. 7 reconstructor output stage.

FIG. 8 is graph 800 of magnitude versus time illustrating one example of reconstructed current signal $V_{recon}$ as generated by reconstructor output stage 700. As shown in graph 800, reconstructed current signal $V_{recon}$ is based off of first current signal $I_{1st}$ from first current circuitry 404 during each first switching state of switching power converter 100, and reconstructed current signal $V_{recon}$ is based off of current sense signal $V_{cs}$ during each second switching state of switching power converter 100.

Referring again to FIG. 4, current reconstructor 400 could be modified to replace reconstructor output stage 412 with a different reconstructor output stage. For example, reconstructor output stage 412 could be replaced with a reconstructor output stage configured to (i) generate reconstructed current signal $V_{recon}$ solely based on current sense signal $V_{cs}$ when duration of the first switching state of switching power converter 100 is at least a first threshold value and (ii) generate reconstructed current signal $V_{recon}$ at least partially based on one or more signals generated within current reconstructor 400 when duration of the first switching state is less than the first threshold value. For example, in some alternate embodiments, current reconstructor output stage 412 is replaced with a reconstructor output stage that is configured to (i) generate reconstructed current signal $V_{recon}$ solely based on current sense signal $V_{cs}$ when duration of the first switching state of switching power converter 100 is at least 40 nanoseconds and (ii) generate reconstructed current signal $V_{recon}$ at least partially based on one or more signals generated within current reconstructor 400, e.g., at least partially based on first current signal $I_{1st}$ when the duration of the first switching state of switching power converter 100 is less than 40 nanoseconds. As another example, reconstructor output stage 412 could be replaced with a reconstructor output stage configured to generate reconstructed current signal $V_{recon}$ based on voltage $V_{cap}$ of capacitive device 402 and current sense signal Vcs.

Figure 9:
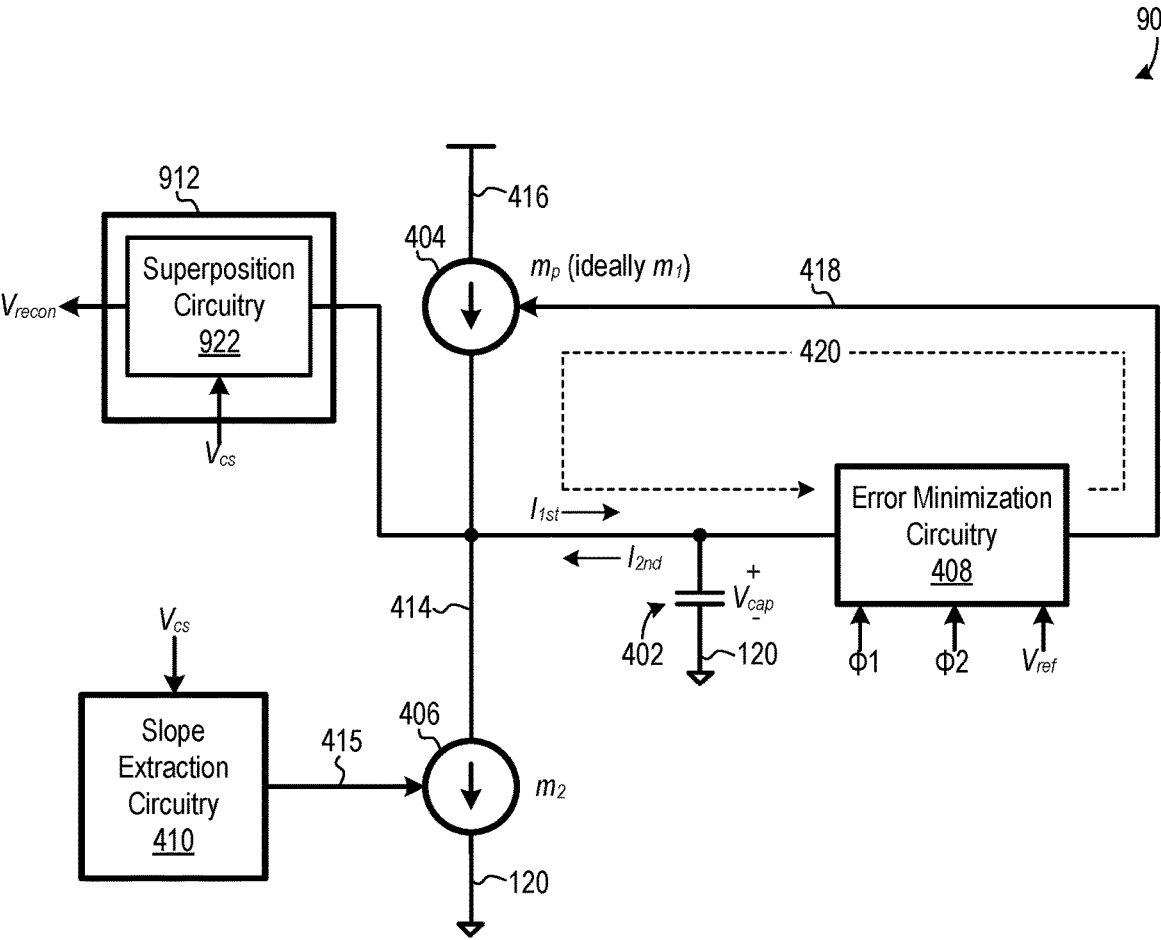
FIG. 9 is a schematic diagram of an alternate embodiment of the FIG. 4 current reconstructor.

For instance, FIG. 9 is a schematic diagram of a current reconstructor 900, which is an alternate embodiment of current reconstructor 400 (FIG. 4) that is modified to replace reconstructor output stage 412 with a reconstructor output stage 912 including superposition circuitry 922 configured to generate reconstructed current signal $V_{recon}$ based on voltage $V_{cap}$ of capacitive device 402 and current sense signal $V_{cs}$. Specifically, superposition circuitry 922 is configured to generate reconstructed current signal $V_{recon}$ at least partially by superimposing a signal proportional to voltage $V_{cap}$ of capacitive device 402 and a signal representing a valley of current $I_L$ obtained from current sense signal $V_{cs}$.

Figure 10:
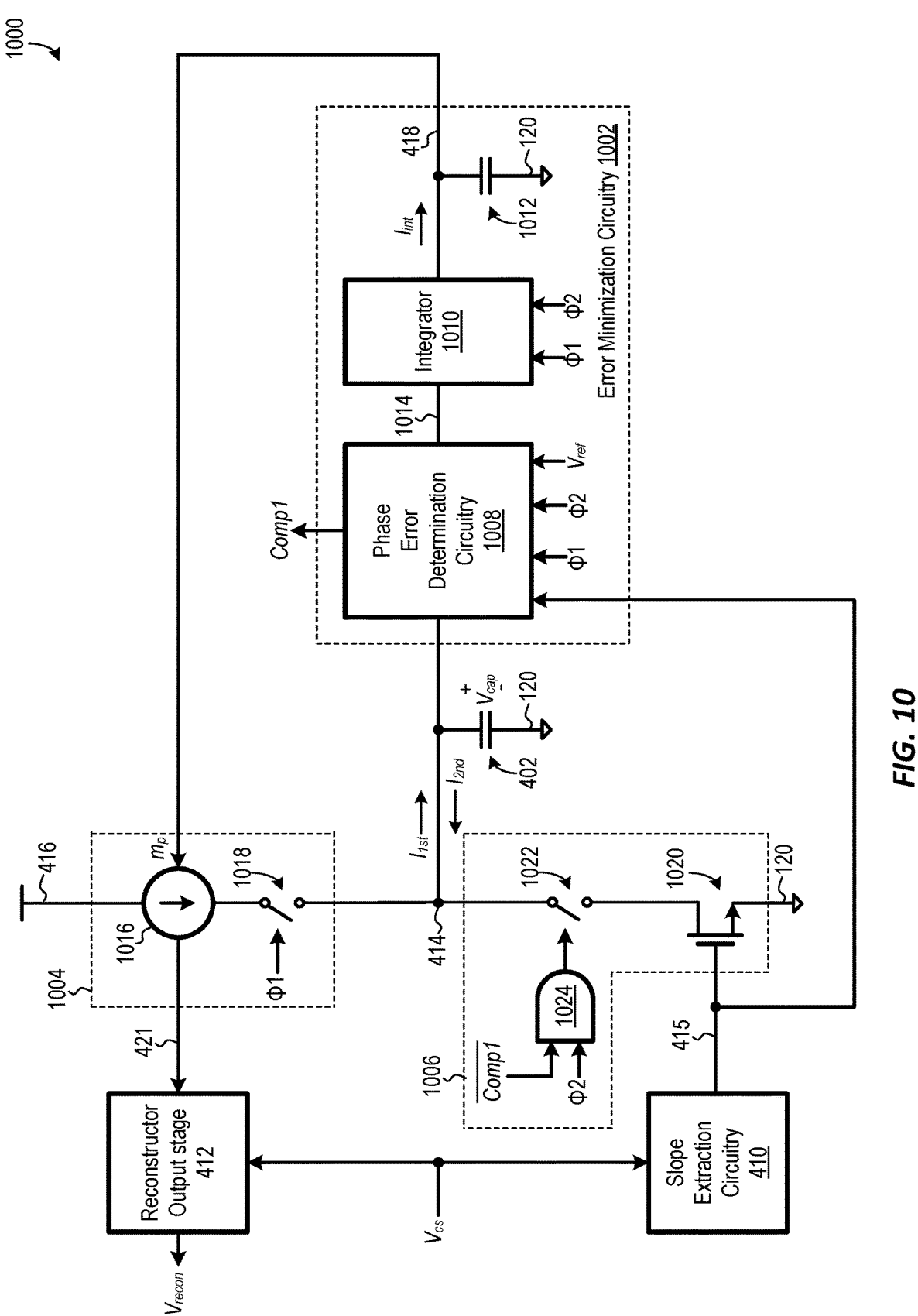
FIG. 10 is a schematic diagram of an embodiment of the FIG. 4 current reconstructor where error minimization circuitry includes phase error determination circuitry, an integrator, and a capacitor.
Figure 11:
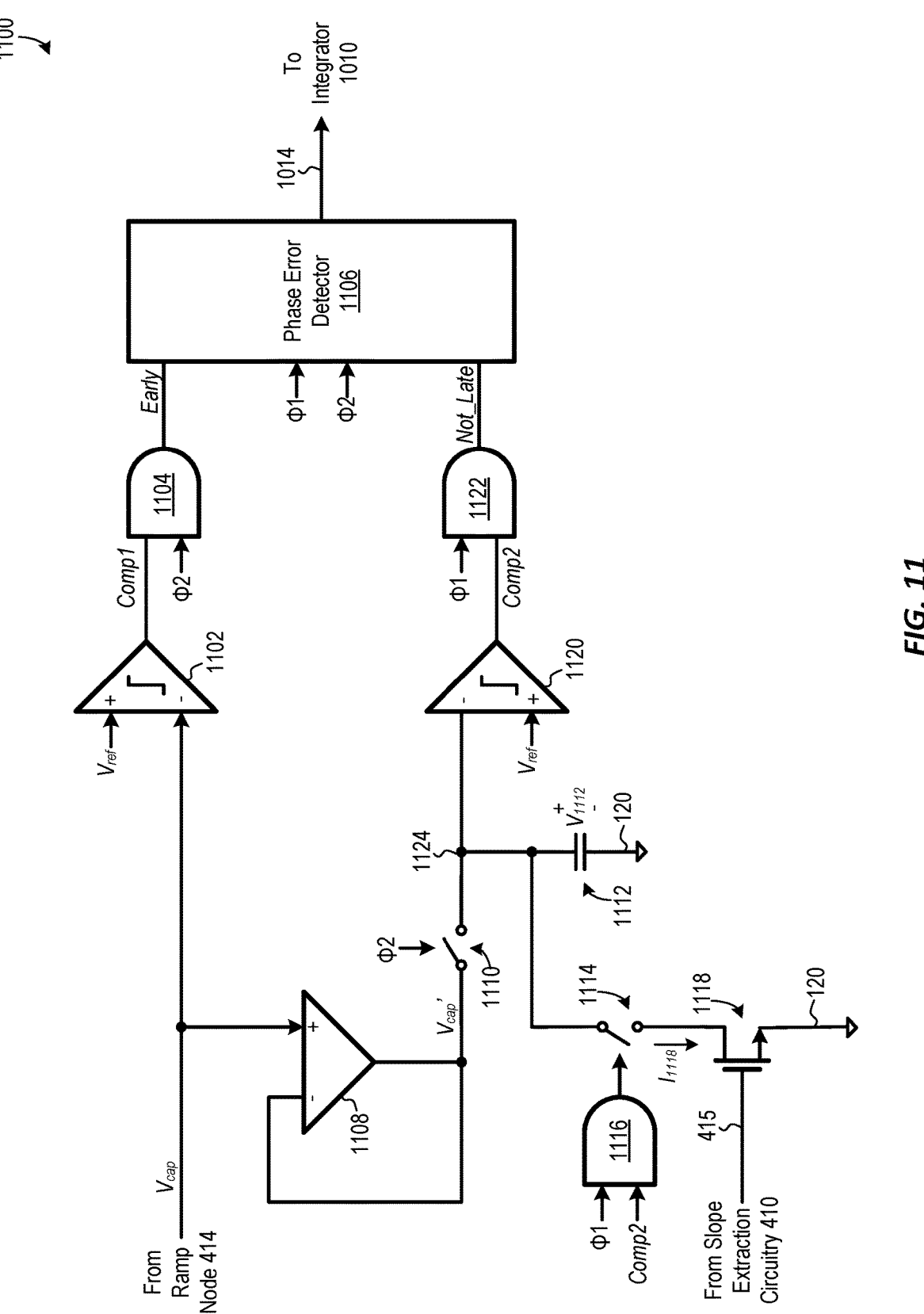
FIG. 11 is a schematic diagram of one embodiment of phase error determination circuitry of the FIG. 10 current reconstructor.
Figure 13:
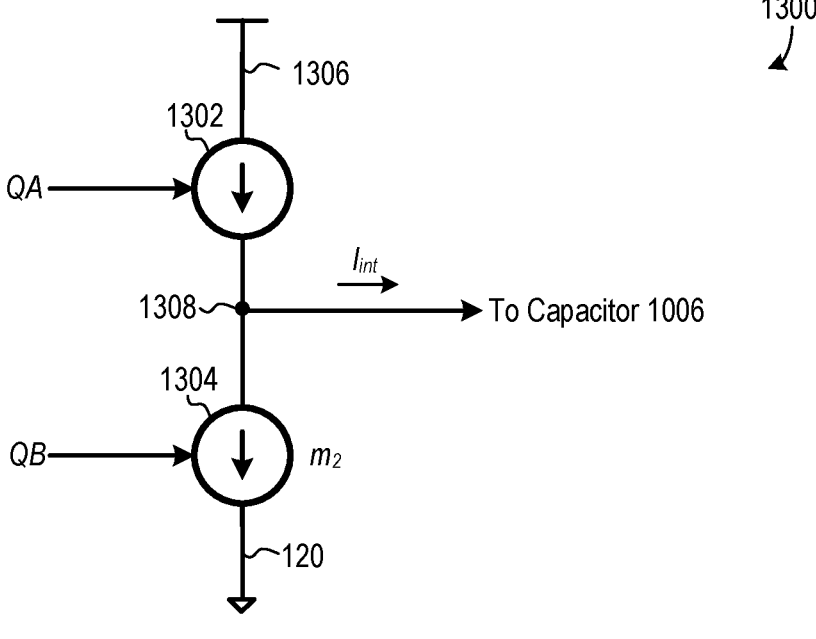
FIG. 13 is schematic diagram of one embodiment of the integrator of the FIG. 10 current reconstructor.

FIG. 10 is a schematic diagram of a current reconstructor 1000, which is one embodiment of current reconstructor 400 (FIG. 4) where (i) error minimization circuitry 408 is embodied by error minimization circuitry 1002, (ii) first current circuitry 404 is embodied by first current circuitry 1004, and (iii) second current circuitry 406 is embodied by second current circuitry 1006. Error minimization circuitry 1002 includes phase error determination circuitry 1008, an integrator 1010, and a capacitor 1012. Phase error determination circuitry 1008 is configured to generate a phase error signal 1014 representing phase error, such as phase error $\theta_{error}$ or of FIG. 5 or phase error $\theta_{error}$ of FIG. 6, in voltage $V_{cap}$ of the capacitive device 402 (FIG. 4). In particular embodiments, phase error determination circuitry 1008 receives as inputs voltage $V_{cap}$, reference voltage $V_{ref}$, control signal $\phi1$, control signal $\phi2$, and current mirror signal 415 from slope extraction circuitry 410. FIG. 11, discussed below, illustrates one possible embodiment of phase error determination circuitry 1008. Integrator 1010 is configured to integrated phase error signal 1014 to generate an integrated signal $I_{int}$, and capacitor 1012 is charged and discharged by integrated signal $I_{int}$, to generate control signal 418 for controlling first current circuitry 1004. FIG. 13, discussed below, illustrates one possible embodiment of integrator 1010.

First current circuitry 1004 includes a current source 1016 and a switching device 1018 electrically coupled in series between power node 416 and ramp node 414. Current source 1016 is configured to generate first current signal $I_{int}$ in accordance with control signal 418 generated by error minimization circuitry 1002. Switching device 1018 operates in its on-state when control signal $\phi1$ is asserted, and switching device 1018 operates in its off-state when control signal $\phi1$ is de-asserted. Accordingly, first current circuitry 1004 applies first current signal $I_{int}$ to capacitive device 402 only during the first switching state of switching power converter 100.

Second current circuitry 1006 includes a FET 1020, a switching device 1022, and an AND gate 1024. Switching device 1022 and FET 1020 are electrically coupled in series between ramp node 414 and reference node 120. FET 1020 is configured to mirror current $I_L$ during the second switching state of switching power converter 100 and thereby generate second current signal $I_{2nd}$, in response to current mirror signal 415 generated by slope extraction circuitry 410. Switching device 1022 is controlled by an output of AND gate 1024, and AND gate 1024 receives an inputs an inverted version of a signal Comp1 and control signal $\phi2$. Phase error determination circuitry 1008 generates signal Comp1 such that signal Comp1 is asserted for a duration of the second switching state of switching power converter 100 after voltage $V_{cap}$ reaches its minimum value. As such, switching device 1022 is on during the second switching state of switching power converter 100 as long as voltage $V_{cap}$ has not reached its minimum value.

FIG. 11 is a schematic diagram of phase error determination circuitry 1100, which is one possible embodiment of phase error determination circuitry 1008 of FIG. 10. Phase error determination circuitry 1100 includes a comparator 1102, an AND gate 1104, a phase error detector 1106, an amplifier 1108, a switching device 1110, a capacitor 1112, a switching device 1114, an AND gate 1116, a FET 1118, a comparator 1120, and an AND gate 1122. Comparator 1102 is configured to compare voltage $V_{cap}$ from ramp node 414 to reference voltage $V_{ref}$, and comparator 1102 is configured to assert signal Comp1 in response to voltage $V_{cap}$ falling to reference voltage $V_{ref}$. Therefore, comparator 1102 asserts signal Comp1 in response to voltage $V_{cap}$ falling to its minimum value. AND gate 1104 compares signal Comp1 to control signal $\phi2$, and AND gate 1104 asserts a signal Early when both signal Comp1 and control signal $\phi2$ are asserted. Accordingly, assertion of signal Early indicates that voltage $V_{cap}$ has fallen to its minimum value before switching power converter 100 has transitioned from its second switching state to its first switching state, such as illustrated in graph 506 of FIG. 5.

Amplifier 1108 is configured to buffer voltage $V_{cap}$ to generate a buffered voltage $V_{cap}'$ on its output. Switching device 1110 is electrically coupled between the output of amplifier 1108 and a comparator node 1124, and switching device 1110 (i) operates in its on-state when control signal $\phi2$ is asserted and (ii) operates in its off-state when control signal $\phi2$ is de-asserted. Accordingly, voltage on comparator node 1124 is equal to buffered voltage $V_{cap}'$ during the second switching state of switching power converter 100. Capacitor 1112 is electrically coupled between comparator node 1124 and reference node 120, and voltage on comparator node 1124 is accordingly equal to a voltage $V_{1112}$ across capacitor 1112 when switching power converter 100 is in its first switching state. Comparator 1120 is configured to compare voltage on comparator node 1124 to reference voltage $V_{ref}$, and comparator 1120 is configured to assert a signal Comp2 in response to voltage on comparator node 1124 falling to reference voltage $V_r$g. AND gate 1122 compares signal Comp2 to control signal $\phi1$, and AND gate 1122 asserts a signal Not_Late when both signal Comp2 and control signal $\phi1$ are asserted. Accordingly, assertion of signal Not_Late indicates that voltage $V_{cap}$ has fallen to its minimum value no later than when switching power converter 100 has transitioned from its second switching state to its first switching state.

Switching device 1114 and FET 1118 are electrically coupled in series between comparator node 1124 and reference node 120. FET 1118 is configured to mirror current $I_L$ during the second switching state of switching power converter 100 in response to current mirror signal 415, such that current $I_{1118}$ flowing through FET 1118 has a slope of $m_2$. AND gate 1116 controls switching device 1114, and AND gate 1116 compares signal $\phi1$ to signal Comp2. Accordingly, switching device 1114 is in its on-state, and FET 1118 thereby discharges capacitor 1112, solely when (i) signal $\phi1$ is asserted and (ii) voltage on comparator node 1124 is greater than reference voltage $V_{ref}$.

Figure 12:
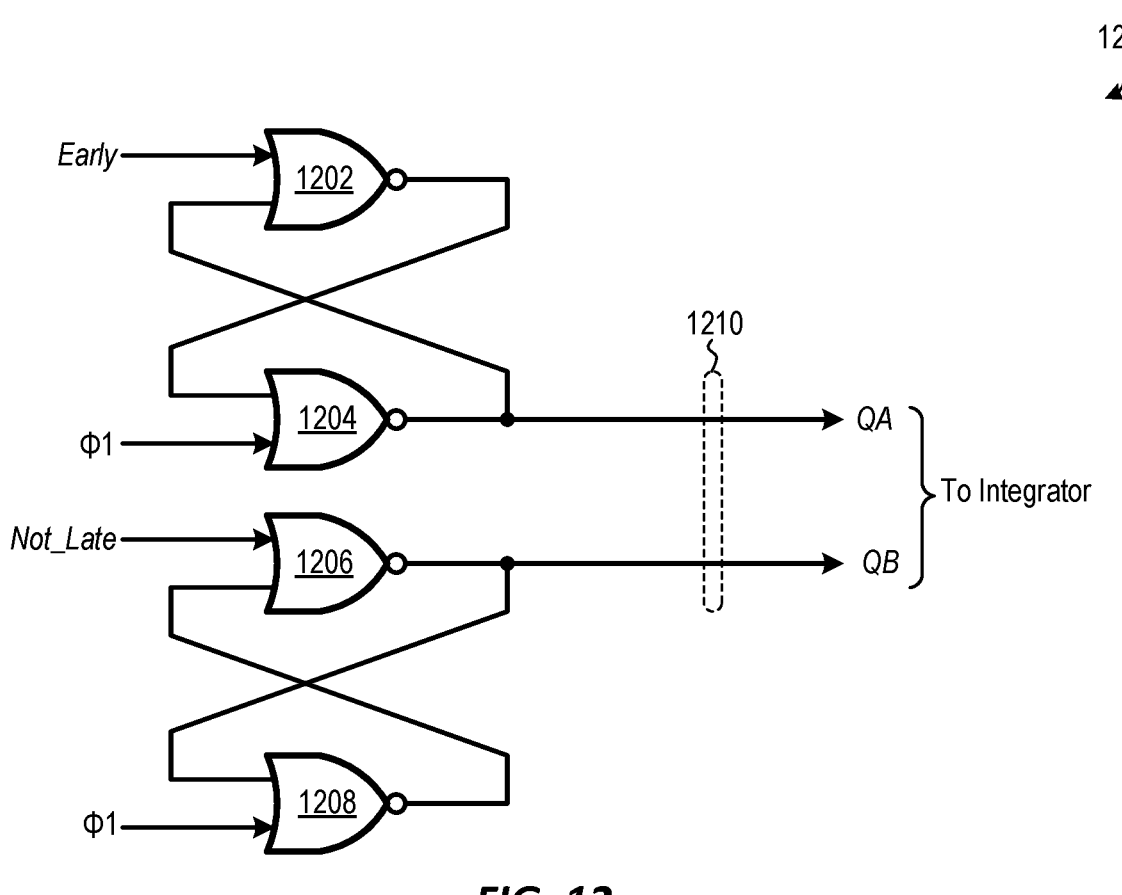
FIG. 12 is a schematic diagram on one embodiment of a phase error detector of the FIG. 11 phase error determination circuitry.

Phase error detector 1106 is configured to generate phase error signal 1014 based on control signals $\phi1$ and $\phi2$ and signal Early and signal Not_Late. FIG. 12 is a schematic diagram of a phase error detector 1200, which is one possible embodiment of phase error detector 1106. Phase error detector 1200 includes four NOR gates 1202, 1204, 1206, and 1208. NOR gate 1202 is configured such that signal Early and an output of NOR gate 1204 are inputs to NOR gate 1202. NOR gate 1204 is configured such that control signal φ1 and an output of NOR gate 1202 are inputs to NOR gate 1204. NOR gate 1206 is configured such that signal Not_Late and an output of NOR gate 1208 are inputs to NOR gate 1206. NOR gate 1208 is configured such that control signal φ1 and an output of NOR gate 1206 are inputs to NOR gate 1208. Phase error detector 1200 generates a phase error signal 1210, which is an embodiment of phase error signal 1014 (FIGS. 10 and 11) and includes two components, i.e., a component QA and a component QB. Component QA is an output of NOR gate 1204, and component QB is an output of AND gate 1206.

FIG. 13 is a schematic diagram of an integrator 1300, which is one possible embodiment of integrator 1010 (FIG. 10) when phase error detector 1106 (FIG. 11) is embodied as phase error detector 1200 (FIG. 12). Integrator 1300, which is configured as a charged pump integrator, includes a charge pump current source 1302 and a charge pump current source 1304. Charge pump current source 1302 is electrically coupled between a power node 1306 and an integrator node 1308, and charge pump current source 1304 is electrically coupled between integrator node 1308 and reference node 120. Charge pump current source 1302 is controlled by component QA of phase error signal 1210 (FIG. 12). Specifically, charge pump current source 1302 is enabled when component QA is asserted, and charge pump current source 1302 is disabled when component QA is de-asserted. Charge pump current source 1304 is controlled by component QB of phase error signal 1210 (FIG. 12). Specifically, charge pump current source 1304 is enabled when component QB is asserted, and charge pump current source 1304 is disabled when component QB is de-asserted. Integrator signal $I_{int}$ flows from integrator node 1308 to capacitor 1012.

Figure 14:
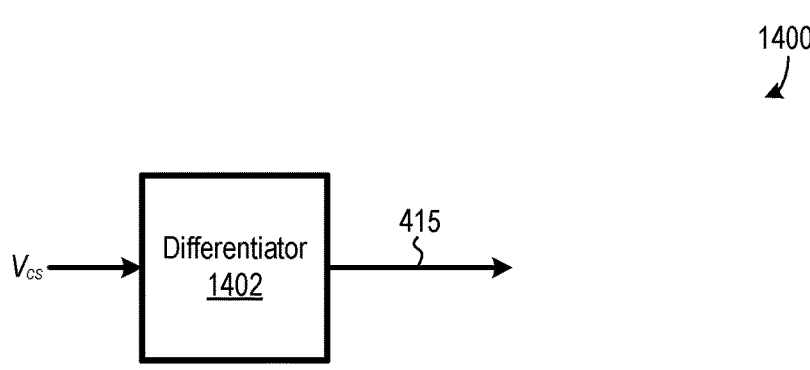
FIG. 14 is a schematic diagram of one embodiment of the slope extraction circuitry of the FIG. 4 current reconstructor.

FIG. 14 is a block diagram of slope extraction circuitry 1400, which is one possible embodiment of slope extraction circuitry 410 (FIGS. 4, 9, and 10). Slope extraction circuitry 1400 includes a differentiator 1402 which is configured to receive current sense signal $V_{cs}$ and generate current mirror signal 415 in voltage form representing slope of current $I_L$ solely during the second switching state of switching power converter 100.

Figure 15:
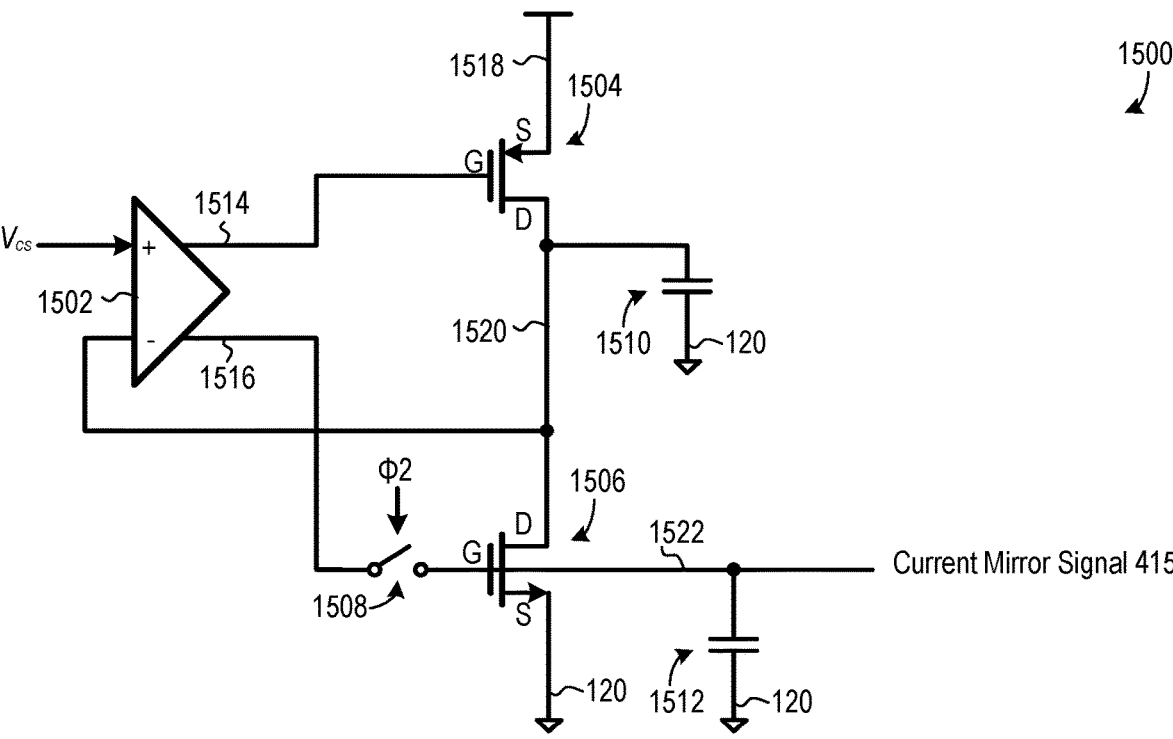
FIG. 15 is a schematic diagram of another embodiment of the slope extraction circuitry of the FIG. 4 current reconstructor.

FIG. 15 is a block diagram of slope extraction circuitry 1500, which is another possible embodiment of slope extraction circuitry 410 (FIGS. 4, 9, and 10). Slope extraction circuitry 1500 includes an amplifier 1502 a P-channel FET 1504, an N-channel FET 1506, a switching device 1508, a capacitor 1510, and a capacitor 1512. Amplifier 1502 includes a positive output 1514 and a negative output 1516. Each of P-channel FET 1504 and N-channel FET 1506 includes a respective gate (G), drain (D), and source (S). The source of P-channel FET 1504 is electrically coupled to a power node 1518, and the drain of P-channel FET 1504 is electrically coupled to a differentiation node 1520. The drain of N-channel FET 1506 is electrically coupled to differentiation node 1520, and the source of N-channel FET 1506 is electrically coupled to reference node 120. Capacitor 1510 is electrically coupled between differentiation node 1520 and reference node 120, and positive output 1514 of amplifier 1502 is electrically coupled to the gate of P-channel FET 1504. Switching device 1508 is electrically coupled between negative output 1516 of amplifier 1502 and a mirror signal output node 1522, and the gate of N-channel FET 1506 is also electrically coupled to mirror signal output node 1522. Capacitor 1512 is electrically coupled between mirror signal output node 1522 and reference node 120.

Amplifier 1502, P-channel FET 1504, and N-channel FET 1506 collectively form a voltage follower, such that voltage at differentiation node 1520 follows voltage of current sense signal $V_{cs}$. Current flowing through capacitor 1510 represents the slope of signal $V_{cs}$, and voltage on mirror signal output node 1522 represents slope of current $I_L$. Accordingly, amplifier 1502 generates current mirror signal 415 on mirror signal output node 1522. Switching device 1508, which is on solely in the second switching state of switching power converter 100, limits slope extraction circuitry 1500 to providing current mirror signal 415 solely during the second switching state of switching power converter 100.

Figure 16:
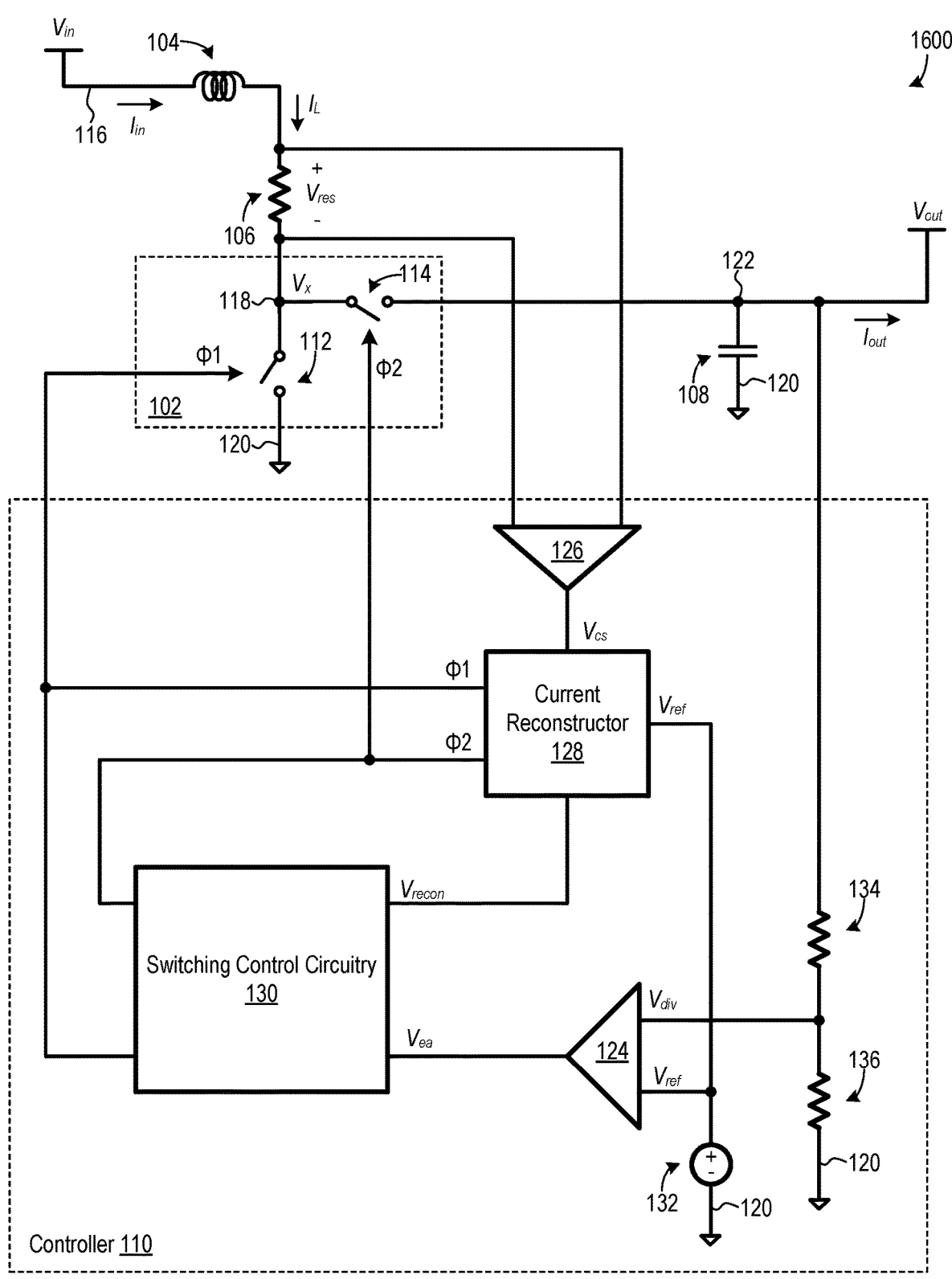
FIG. 16 is a schematic diagram of an alternate embodiment of the FIG. 1 switching power converter having a boost topology instead of a buck topology.

Referring again to FIG. 1, while switching power converter 100 has a buck-topology, the new current reconstructors and associated systems and methods are not limited to use with buck switching power converters. Instead, the new current reconstructors could be used with other switching power converter topologies, including but not limited to, switching power converters with a boost topology or a buck-boost topology, with appropriate changes to controller configuration. For example, FIG. 16 is a schematic diagram of a switching power converter 1600, which is an alternate embodiment of switching power converter 100 configured to have a boost topology. In switching power converter 1600, inductor 104 and current sense resistor 106 are electrically coupled in series between input power node 116 and switching node 118. Additionally, control switching device 112 is electrically coupled between switching node 118 and reference node 120, and freewheeling switching device 114 is electrically coupled between switching node 118 and output power node 122.

The new current reconstructors and associated systems and methods could also be used in switching power converters having multiple power stages electrically coupled in parallel, such as a "multi-phase" switching power converter having two or more power stages electrically coupled in parallel where the power stages switch out-of-phase with respect to each other. Furthermore, the new current reconstructors and associated systems and methods could be used in switching power converters having multiple power stages electrically coupled in series, such as two or more power stages having a daisy chain configuration.

Experimental Results

Figure 17:
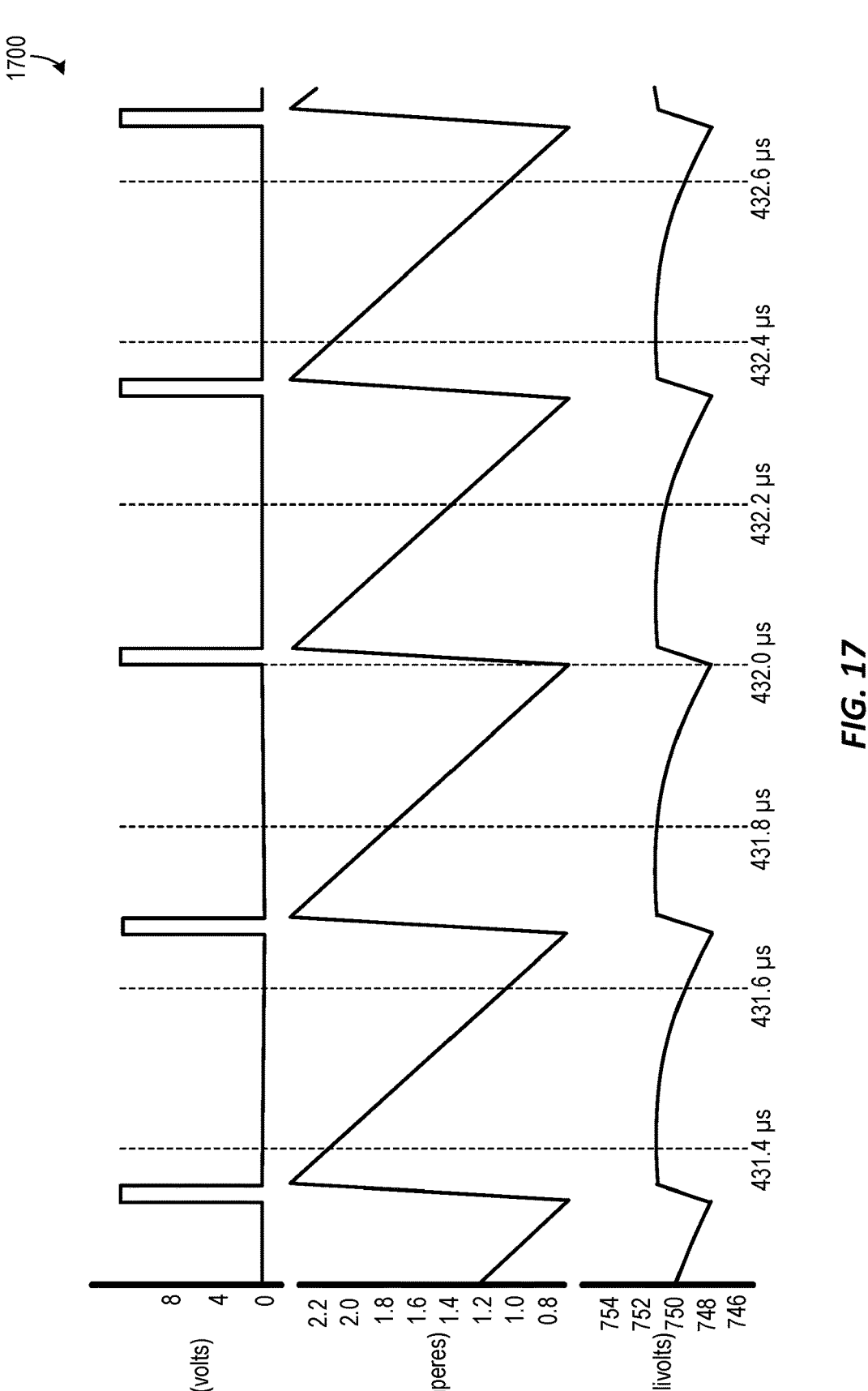
FIG. 17 is a graph illustrated simulated operation of an embodiment of the FIG. 1 switching power converter.

FIG. 17 is a graph 1700 illustrating a simulated operation of an embodiment of switching power converter 100 where (i) $V_{in}$=12 volts, (ii) $V_{out}$=750 millivolts, (iii) switching frequency=3 Megahertz, (iv) duration of the first switching state=21 nanoseconds per switching period, and (v) delay of current sense amplifier 126 exceeds 30 nanoseconds. Graph 1700 illustrates each of switching node voltage $V_x$, inductor current $I_L$, and output voltage $V_{out}$ as a function of time. As evident from the waveforms of FIG. 17, the simulated switching power converter operated in a stable manner, e.g., both output voltage ripple and $t_{on}$ were consistent among switching cycles, even though first switching state duration was very small and current sense amplifier delay was significant.

Combinations of Features

Features described above may be combined in various ways without departing from the scope hereof. The following examples illustrate some possible combinations.

(A1) A method for generating an inductor current signal representing magnitude of current flowing through an inductor of a switching power converter includes (1) applying a first current signal to a first capacitive device during a first switching state of the switching power converter, the first current signal having a first slope, (2) applying a second current signal to the first capacitive device during a second switching state of the switching power converter, the second current signal having a polarity that is opposite of a polarity of the first current signal, and (3) adjusting the first slope to reduce a phase error in a voltage of the first capacitive device, the phase error in the voltage of the first capacitive device representing a difference between (a) a time when the voltage of the first capacitive device reaches a minimum value and (b) a time when the switching power converter transitions from its second switching state to its first switching state.

(A2) The method denoted as (A1) may further include generating the inductor current signal such that the inductor current signal is proportional to the voltage of the first capacitive device or the first current signal, during at least the first switching state of the switching power converter.

(A3) In either one of the methods denoted as (A1) or (A2), (1) the first switching state of the switching power converter may be at least partially characterized by a control switching device of the switching power converter operating in an on-state, and (2) the second switching state of the switching power converter may be at least partially characterized by the control switching device of the switching power converter operating in an off-state.

(A4) In any one of the methods denoted as (A1) through (A3), adjusting the first slope to reduce the phase error in the voltage of the first capacitive device may include (1) generating a phase error signal representing the phase error in the voltage of the first capacitive device, (2) integrating the phase error signal to generate an integrated signal, and (3) controlling first current circuitry at least partially based on the integrated signal, the first current circuitry generating the first current signal.

(A5) In any one of the methods denoted as (A1) through (A4), adjusting the first slope to reduce the phase error in the voltage of the first capacitive device may include increasing the first slope in response to the time when the voltage of the first capacitive device reaches the minimum value being before the time when the switching power converter transitions from its second switching state to its first switching state.

(A6) In any one of the methods denoted as (A1) through (A4), adjusting the first slope to reduce the phase error in the voltage of the first capacitive device may include decreasing the first slope in response to the time when the voltage of the first capacitive device reaches the minimum value being after the time when the switching power converter transitions from its second switching state to its first switching state.

(A7) Any one of the methods denoted as (A1) through (A6) may further include generating the second current signal by mirroring current flowing through the inductor of the switching power converter during the second switching state of the switching power converter.

(A8) In any one of the methods denoted as (A1) through (A7), (1) the polarity of the first current signal may be such that the first current signal flows into the first capacitive device, and (2) the polarity of the second current signal may be such that the second current signal flows out of the first capacitive device.

(A9) Any one of the methods denoted as (A1) through (A8) may further include at least partially controlling operation of the switching power converter using a peak current mode control technique at least partially characterized by comparing the inductor current signal to an error amplifier signal, the error amplifier signal representing an error in a magnitude of an output voltage of the switching power converter.

(A10) Any one of the methods denoted as (A1) through (A9) may further include (1) generating the inductor current signal during the first switching state of the switching power converter such that the inductor current signal is proportional to the first current signal and (2) generating the inductor current signal during the second switching state of the switching power converter by sensing current flowing through the inductor.

(B1) A current reconstructor configured to generate an inductor current signal representing magnitude of current flowing through an inductor of a switching power converter includes (1) a first capacitive device, (2) first current circuitry configured to apply a first current signal to the first capacitive device during a first switching state of the switching power converter, the first current signal having a first slope, (3) second current circuitry configured to apply a second current signal to the first capacitive device during a second switching state of the switching power converter, the second current signal having a polarity that is opposite of a polarity of the first current signal, and (4) error minimization circuitry configured to adjust the first slope to reduce a phase error in a voltage of the first capacitive device, the phase error in the voltage of the first capacitive device representing a difference between (a) a time when the voltage of the first capacitive device reaches a minimum value and (b) a time when the switching power converter transitions from its second switching state to its first switching state.

(B2) The current reconstructor denoted as (B1) may be configured to generate the inductor current signal at least partially based on the first current signal.

(B3) The current reconstructor denoted as (B1) may be configured to generate the inductor current signal at least partially based on the voltage of the first capacitive device.

(B4) In any one of the current reconstructors denoted as (B1) through (B3), the error minimization circuitry may include (1) phase error determination circuitry configured to generate a phase error signal representing the phase error in the voltage of the first capacitive device and (2) an integrator configured to integrate the phase error signal to generate an integrated signal for controlling the first current circuitry.

(B5) In any one of the current reconstructors denoted as (B1) through (B4), the second current circuitry may be configured to mirror current flowing through the inductor of the switching power converter during the second switching state of the switching power converter.

(C1) A switching power converter includes an inductor and a current reconstructor configured to generate an inductor current signal representing magnitude of current flowing through the inductor. The current reconstructor includes (1) a first capacitive device, (2) first current circuitry configured to apply a first current signal to the first capacitive device during a first switching state of the switching power converter, the first current signal having a first slope, (3) second current circuitry configured to apply a second current signal to the first capacitive device during a second switching state of the switching power converter, the second current signal having a polarity that is opposite of a polarity of the first current signal, and (4) error minimization circuitry configured to adjust the first slope to reduce a phase error in a voltage of the first capacitive device, the phase error in the voltage of the first capacitive device representing a difference between (a) a time when the voltage of the first capacitive device reaches a minimum value and (b) a time when the switching power converter transitions from its second switching state to its first switching state.

(C2) In the switching power converter denoted as (C1), the second current circuitry may be configured to mirror current flowing through the inductor during the second switching state of the switching power converter.

(C3) Either one of the switching power converters denoted as (C1) or (C2) may further include a switching stage electrically coupled to the inductor.

(C4) Any one of the switching power converters denoted as (C1) through (C3) may further include switching control circuitry configured to control operation of the switching stage to regulate at least one parameter of the switching power converter.

(C5) In any one of the switching power converters denoted as (C1) through (C4), the switching control circuitry may be configured to control operation of the switching stage at partially based on one of (a) a signal representing voltage at the first capacitive device and (b) a signal representing the first current signal.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for generating an inductor current signal representing magnitude of current flowing through an inductor of a switching power converter, the method comprising:

applying a first current signal to a first capacitive device during a first switching state of the switching power converter, the first current signal having a first slope;

applying a second current signal to the first capacitive device during a second switching state of the switching power converter, the second current signal having a polarity that is opposite of a polarity of the first current signal; and adjusting the first slope to reduce a phase error in a voltage of the first capacitive device, the phase error in the voltage of the first capacitive device representing a difference between (a) a time when the voltage of the first capacitive device reaches a minimum value and (b) a time when the switching power converter transitions from its second switching state to its first switching state.

2. The method of claim 1, further comprising generating the inductor current signal such that the inductor current signal is proportional to the voltage of the first capacitive device or the first current signal, during at least the first switching state of the switching power converter.

3. The method of claim 1, wherein:

the first switching state of the switching power converter is at least partially characterized by a control switching device of the switching power converter operating in an on-state; and the second switching state of the switching power converter is at least partially characterized by the control switching device of the switching power converter operating in an off-state.

4. The method of claim 1, wherein adjusting the first slope to reduce the phase error in the voltage of the first capacitive device comprises:

generating a phase error signal representing the phase error in the voltage of the first capacitive device;

integrating the phase error signal to generate an integrated signal; and controlling first current circuitry at least partially based on the integrated signal, the first current circuitry generating the first current signal.

5. The method of claim 1, wherein adjusting the first slope to reduce the phase error in the voltage of the first capacitive device comprises increasing the first slope in response to the time when the voltage of the first capacitive device reaches the minimum value being before the time when the switching power converter transitions from its second switching state to its first switching state.

6. The method of claim 1, wherein adjusting the first slope to reduce the phase error in the voltage of the first capacitive device comprises decreasing the first slope in response to the time when the voltage of the first capacitive device reaches the minimum value being after the time when the switching power converter transitions from its second switching state to its first switching state.

7. The method of claim 1, further comprising generating the second current signal by mirroring current flowing through the inductor of the switching power converter during the second switching state of the switching power converter.

8. The method of claim 1, wherein:

the polarity of the first current signal is such that the first current signal flows into the first capacitive device; and the polarity of the second current signal is such that the second current signal flows out of the first capacitive device.

9. The method of claim 1, further comprising at least partially controlling operation of the switching power converter using a peak current mode control technique at least partially characterized by comparing the inductor current signal to an error amplifier signal, the error amplifier signal representing an error in a magnitude of an output voltage of the switching power converter.

10. The method of claim 1, further comprising:

generating the inductor current signal during the first switching state of the switching power converter such that the inductor current signal is proportional to the first current signal; and generating the inductor current signal during the second switching state of the switching power converter by sensing current flowing through the inductor.

11. A current reconstructor configured to generate an inductor current signal representing magnitude of current flowing through an inductor of a switching power converter, the current reconstructor comprising:

a first capacitive device;

first current circuitry configured to apply a first current signal to the first capacitive device during a first switching state of the switching power converter, the first current signal having a first slope;

second current circuitry configured to apply a second current signal to the first capacitive device during a second switching state of the switching power converter, the second current signal having a polarity that is opposite of a polarity of the first current signal; and error minimization circuitry configured to adjust the first slope to reduce a phase error in a voltage of the first capacitive device, the phase error in the voltage of the first capacitive device representing a difference between (a) a time when the voltage of the first capacitive device reaches a minimum value and (b) a time when the switching power converter transitions from its second switching state to its first switching state.

12. The current reconstructor of claim 11, wherein the current reconstructor is configured to generate the inductor current signal at least partially based on the first current signal.

13. The current reconstructor of claim 11, wherein the current reconstructor is configured to generate the inductor current signal at least partially based on the voltage of the first capacitive device.

14. The current reconstructor of claim 11, wherein the error minimization circuitry comprises:

phase error determination circuitry configured to generate a phase error signal representing the phase error in the voltage of the first capacitive device; and an integrator configured to integrate the phase error signal to generate an integrated signal for controlling the first current circuitry.

15. The current reconstructor of claim 11, wherein the second current circuitry is configured to mirror current flowing through the inductor of the switching power converter during the second switching state of the switching power converter.

16. A switching power converter, comprising:

an inductor; and a current reconstructor configured to generate an inductor current signal representing magnitude of current flowing through the inductor, the current reconstructor including:

a first capacitive device, first current circuitry configured to apply a first current signal to the first capacitive device during a first switching state of the switching power converter, the first current signal having a first slope, second current circuitry configured to apply a second current signal to the first capacitive device during a second switching state of the switching power converter, the second current signal having a polarity that is opposite of a polarity of the first current signal, and error minimization circuitry configured to adjust the first slope to reduce a phase error in a voltage of the first capacitive device, the phase error in the voltage of the first capacitive device representing a difference between (a) a time when the voltage of the first capacitive device reaches a minimum value and (b) a time when the switching power converter transitions from its second switching state to its first switching state.

17. The switching power converter of claim 16, wherein the second current circuitry is configured to mirror current flowing through the inductor during the second switching state of the switching power converter.

18. The switching power converter of claim 16, further comprising a switching stage electrically coupled to the inductor.

19. The switching power converter of claim 18, further comprising switching control circuitry configured to control operation of the switching stage to regulate at least one parameter of the switching power converter.

20. The switching power converter of claim 19, wherein the switching control circuitry is configured to control operation of the switching stage at partially based on one of (a) a signal representing voltage at the first capacitive device and (b) a signal representing the first current signal.

* * * * *